United States Patent

Furuya

[11] Patent Number: 6,163,312
[45] Date of Patent: Dec. 19, 2000

[54] PORTABLE RADIO INFORMATION TERMINAL, SCREEN SCROLL METHOD, RECORDING MEDIUM AND MICROCOMPUTER

[75] Inventor: Mami Furuya, Tokyo, Japan

[73] Assignee: Sony Corporation, Tokyo, Japan

[21] Appl. No.: 09/216,962

[22] Filed: Dec. 21, 1998

[30] Foreign Application Priority Data

Dec. 22, 1997 [JP] Japan ................................. 9-353485

[51] Int. Cl.[7] ................................................ G09G 5/34
[52] U.S. Cl. ...................... 345/123; 345/112; 455/38.1
[58] Field of Search .................... 345/123, 112, 345/163, 157, 115, 121; 455/38, 67, 226; 341/29, 34

[56] References Cited

U.S. PATENT DOCUMENTS

| | | | |
|---|---|---|---|
| 4,670,747 | 6/1987 | Jaime et al. | 340/825 |
| 5,313,229 | 5/1994 | Gilligan et al. | 345/157 |
| 5,495,267 | 2/1996 | Fujitaka | 345/123 |
| 5,640,684 | 6/1997 | Konosu et al. | 455/67 |
| 5,715,311 | 2/1998 | Sudo et al. | 379/428 |
| 5,831,589 | 11/1999 | Toriyama et al. | 345/112 |
| 5,831,614 | 11/1998 | Tognazzine et al. | 345/341 |
| 5,930,352 | 7/1999 | Hiraiwa | 379/387 |
| 5,940,769 | 8/1999 | Nakajima et al. | 455/509 |
| 6,055,412 | 4/2000 | Min | 455/38 |

*Primary Examiner*—Jeffery Brier
*Assistant Examiner*—Thu-Thao Havan
*Attorney, Agent, or Firm*—Jay H. Maioli

[57] ABSTRACT

A portable radio information terminal is provided with an unprocessed-signal detecting circuit for detecting unprocessed upward or downward scroll command signals generated by a rotary input device, a screen moving-down circuit for moving down a displayed screen by as many lines as unprocessed downward scroll command signals detected by the unprocessed-signal detecting circuit, a screen moving-up circuit for moving up a displayed screen by as many lines as unprocessed upward scroll command signals detected by the unprocessed-signal detecting circuit and a display control circuit for counting the number of unprocessed downward or upward scroll command signals detected by the unprocessed-signal detecting circuit and for driving the screen moving-down circuit in the case of unprocessed downward scroll command signals or the screen moving-up circuit in the case of unprocessed upward scroll command signals.

5 Claims, 17 Drawing Sheets

FIG. 7

LUT (LOOKUP TABLE)

| FILE NUMBER | ENTRY POINT |
|---|---|
| F1 | pt1' |
| F2 | pt2 |
| F3 | pt3 |
| F4 | pt4 |
| ⋮ | ⋮ |
| Fn | ptn |

IF (IMAGE FILE)

CC1
DD1
EE1
FF1

PORTABLE RADIO INFORMATION TERMINAL, SCREEN SCROLL METHOD, RECORDING MEDIUM AND MICROCOMPUTER

BACKGROUND OF THE INVENTION

In general, the present invention relates to a portable radio information terminal and a screen-scroll method. More particularly, the present invention relates to a portable radio information terminal for confirming that an electric wave received from a radio base station installed at a remote location is a message signal destined for the portable radio information terminal, for notifying the user of the received message signal in the form of sound, light, mechanical vibration or another form to make the user aware of the arrival of the message signal, for displaying a message conveyed in the signal on an embedded screen display unit and for scrolling the displayed screen in accordance with a command entered by the user. In particular, the present invention relates to a portable radio information terminal for carrying out radio communication of signals such as a pager and a pocket bell and relates to a screen-scroll method adopted in the portable radio information terminal.

A portable radio information terminal is a handy and portable apparatus that is capable of functioning as a terminal of a communication network. In recent years, there have been implemented portable radio information terminals with a variety of configurations and functions to meet a rapidly growing demand in a wide range of applications in the field of information communication.

An example of such a portable radio information terminal is a pager which is widely used for carrying out communications of radio signals.

An early pager generates bell sound when a calling signal is received from a radio base station. A radio calling signal is capable of calling the user carrying this pager even if the user is present at a separated place. The radio calling signal is normally used to urge the user to respond to the calling signal by using a wire telephone closest to the user.

A signal generated by the radio base station is not merely ended with such a calling signal. A signal generated by the radio base station is also capable of conveying information. On the pager side, on the other hand, information conveyed by an incoming signal is decoded and a result of the decoding is stored in a memory unit and displayed on a liquid-crystal display panel as a message. A pager having functions to decode, store and display such information has been developed and widely used at the present time.

In recent years, such a pager is further provided with a message notifying unit having a function of generating ringing sound of a bell to notify the user of an incoming message. While the ringing sound of a bell used as a message is an effective message notifying means, it is feared that the user can not hear the sound of the message or the calling sound in the event of an incoming call in some cases when the pager is used outdoors or at a trip destination or, in particular, in a noisy environment. At a place such as a movie theater or a lecture meeting place, on the other hand, there is not much noise. At such a place, however, message sound or calling sound will be a disturbance to the atmosphere. In order to solve the problems described above, the message notifying unit is generally designed into a configuration also including a vibration function of a vibrator for informing the user of a message by vibration in place of ringing sound of a bell. The configuration allows the user to manually operate an input device to select either ringing sound of a bell or vibration of a vibrator as a message-notification means.

The portable radio information terminal is provided with an input device for use by the user to specify an operating condition. In the conventional portable radio information terminal, the input device is usually a device of the key or button type.

However, a key-type or button-type input device is not always appropriate for a continuous input operation. That is to say, with such an input device, there is limitation on the continuous input operation. Moreover, each key or button has a unique function so that, in the case of a portable radio information terminal having more functions, the number of keys or buttons increases, making the operation complicated. As a result, there is raised a problem of a hindrance to efforts to make the portable radio information terminal smaller in size.

In order to solve the problems described above, there has been developed a rotary/press input device comprising a rotary input operation unit and a press switch built into a single assembly in place of the input device with the key or button type.

Such a rotary/press input device is put to practical use typically as a jog dial or a rotary encoder. The rotary input operation unit is implemented by a disc-shaped knob built into a single assembly with the press switch. The disc-shaped knob can be rotated in clockwise (right) and counterclockwise (left) directions with a high degree of freedom to generate a control signal with ease.

It is thus possible to carry out an operation to generate a plurality of input signals within a unit time with ease. In addition, since signals of 2 different types can be obtained from a single rotary/press input device, the space occupied by input devices can be reduced.

By the way, in an operation to display message information or a message text conveyed by an incoming signal, there is a limit on the number of lines of the message text that can displayed on the screen of the image displaying unit. Typically, only up to 4 lines of message information can be displayed. Thus, in the case of a message text composed of a number of lines, the user needs to carry out an operation to scroll up or down the message text in order to display all the lines sequentially.

In an operation to scroll up a displayed message text, the text is updated in the upward direction. In an operation to scroll down a displayed message text, on the other hand, the text is updated in the downward direction. It is desirable to allow the user to manually specify the number of lines by which the scroll operation is to be carried out and the direction as well as the speed of the scroll operation.

Particularly, in order to display a message text with a large number of lines, it is desirable to design a portable radio information terminal into a configuration wherein a command to perform a scroll operation can be carried out a plurality of times in a short period of time and, hence, a scroll processing function can be executed at a high speed.

Since the rotary input operation unit described above can be rotated at a high speed, a number of input signals can be generated in a unit time. Thus, such a rotary input operation unit is suitable for an operation to enter a command to scroll the screen. At least, the input operation can be carried out at a high speed.

However, while an input operation to scroll the displayed screen by a plurality of lines in a short period of time can be carried out, there is a problem caused of a hindrance to a fast response by the scroll processing function of the portable radio information terminal to follow such an input operation.

In order to scroll a displayed screen at a high speed, for example, a command to request a scroll operation is entered via the input unit continuously a plurality of times in a short period of time. A signal requesting a scroll operation is generated for each input operation. Thus, if 8 input operations are carried out consecutively in a short period of time, 8 signals each requesting a scroll operation are generated. As a result, a scroll operation by 1 line is carried out consecutively.

With the conventional technology, the image is just shifted by 1 line in each scroll operation. In addition, the shifted screen is displayed at the end of each scroll operation. In the above example, 8 screens are displayed sequentially before the series of scroll operations are completed FIG. 16 is an explanatory diagram showing the conventional downward 1-line scroll processing. As shown in the figure, downward 1-line scroll processing is carried out consecutively 3 times on an initial screen image G140. At the end of the first scroll operation, data EE appears on the last line of the screen while top data AA disappears from the screen, resulting in a screen image G141. The second scroll operation results in a screen image G142 and the third scroll operation results in a screen image G143.

As described above, 3 new different screens are displayed in order to update the image G140 with the image G143.

FIG. 17 is an explanatory diagram showing the conventional upward 1-line scroll processing. As shown in the figure, upward 1-line scroll processing is carried out consecutively 3 times on an initial screen image G150. At the end of the first scroll operation, data KK appears on the first line of the screen while bottom data OO disappears from the screen, resulting in a screen image G151. Then, the second scroll operation results in a screen image G152 and the third scroll operation results in a screen image G153.

As described above, 3 new different screens are displayed in order to update the image G150 with the image G153.

If the processing speed of the image displaying unit and/or the peripheral circuit to update the screen displayed on the liquid-crystal display panel is low and/or there is a limit on the processing speed of the CPU, the scroll processing does not follow up operations carried out by the user to enter commands requesting scroll processing. In this case, the performance of the portable radio information terminal is limited by the processing speeds of the image displaying unit, the peripheral circuit and/or the CPU. Thus, since it takes time to complete an operation to update the screen which is carried out for each 1-line scroll operation, the scroll processing does not follow up the operations carried out by the user to enter the commands requesting the scroll processing in a short period of time. That is to say, there is a gap between the speed of the input operations carried out by the user and the speed of the scroll processing performed by the portable radio information terminal. As a result, there are raised a problem of impossible smooth processing and a problem that the user is not capable of operating the portable radio information terminal in a way the user likes.

SUMMARY OF THE INVENTION

It is thus an object of the present invention addressing the problems encountered in a portable radio information terminal adopting the conventional scroll technology as described above to provide a portable radio information terminal capable of carrying out an operation to scroll a screen appearing on the image displaying unit thereof speedily and smoothly and a screen-scroll method for the portable radio information terminal.

According to a first aspect of the present invention, there is provided a screen scroll method adopted in a portable radio information terminal capable of scrolling up or down an image displayed on a screen of an image displaying unit employed in the portable radio information terminal by as many lines as scroll command signals requesting a scroll operation to scroll up or down the image whereby, if at least an unprocessed scroll command signal exists, the displayed image is scrolled up or down over the screen by as many lines as the unprocessed scroll command signals.

That is, in continuous execution of a plurality of consecutive scroll operations, an image displayed on the screen is scrolled up or down by as many lines as unprocessed scroll demand signals. Thus, the scroll processing can be carried out as batch processing without displaying an intermediate screen image for each intermediate scroll operation until the last scroll operation, allowing only the screen of final screen image to be displayed. As a result, the magnitudes of loads borne by a CPU, the image displaying unit and a peripheral circuit can be reduced, allowing scroll processing to be carried out at a high speed even if the processing speeds of the CPU, the image displaying unit and the peripheral circuit are not high.

According to a second aspect of the present invention, there is provided a portable radio information terminal which comprises: a radio communication means; a control means for at least carrying out data processing; and an image displaying unit capable of scrolling up and down an image displayed on a screen thereof by at least one line, wherein the control means at least displays information extracted from a radio electric wave received by the radio communication means from a transmitter on the image displaying means, the portable radio information terminal further comprising: an input device including a freely operatable operation unit capable of generating a plurality of upward or downward scroll command signals resulting from an operation carried out on the input unit; an unprocessed-signal detecting means capable of detecting unprocessed upward or downward scroll command signals among upward or downward scroll command signals generated by the operation unit; a screen moving-up means for shifting up a displayed screen by as many as unprocessed upward scroll command signals; a screen moving-down means for shifting down a displayed screen by as many as unprocessed downward scroll command signals; and a display control means for at least counting the number of unprocessed upward or downward scroll command signals and driving the screen moving-up means in the case of upward scroll command signals or the screen moving-down means in the case of downward scroll command signals.

That is, in continuous execution of a plurality of consecutive scroll operations, an image displayed on the screen is scrolled up or down by as many lines as unprocessed scroll demand signals. Thus, the scroll processing can be carried out as batch processing without displaying an intermediate screen image for each intermediate scroll operation until the last scroll operation, allowing only the final screen image to be displayed.

As a result, the magnitudes of loads borne by a CPU, the image displaying unit and a peripheral circuit can be reduced, allowing scroll processing to be carried out at a high speed even if the processing speeds of the CPU, the image displaying unit and the peripheral circuit are not high.

According to a third aspect of the present invention, there is provided a recording medium used for storing programs that can be fetched for execution by a computer. The programs include at least 4 means, namely: an unprocessed-signal detecting means capable of detecting unprocessed upward or downward scroll command signals among upward or downward scroll command signals requesting respectively a scroll-down or a scroll-up operation of an image displayed on a screen; a screen moving-up means for shifting up a displayed screen by as many as unprocessed upward scroll command signals; a screen moving-down means for shifting down a displayed screen by as many as unprocessed downward scroll command signals; and a display control means for at least counting the number of unprocessed upward or downward scroll command signals and driving the screen moving-up means in the case of upward scroll command signals or the screen moving-down means in the case of downward scroll command signals.

As a result, by incorporating the recording medium in a portable radio information terminal equipped with an input device, a central processing unit, an image displaying unit and a memory unit for storing messages as a memory for storing operating procedures each executable by the central processing unit and by letting the central processing unit sequentially execute the means each as an operating procedure, it is possible to provide the portable radio information terminal with functions: to carry out the scroll processing as batch processing without displaying an intermediate screen image for each intermediate scroll operation until the last scroll operation, allowing only the final screen image to be displayed; and to reduce the magnitudes of loads borne by the central processing unit, the image displaying unit and a peripheral circuit.

According to a fourth aspect of the present invention, there is provided a microcomputer which includes an embedded central processing unit and an embedded storage unit for storing programs as procedures which can each be fetched for execution by the central processing unit. The programs include means, namely, an unprocessed-signal detecting means capable of detecting unprocessed upward or downward scroll command signals among upward or downward scroll command signals requesting respectively a scroll-down or a scroll-up operation of an image displayed on a screen; a screen moving-up means for shifting up a displayed screen by as many as unprocessed upward scroll command signals; a screen moving-down means for shifting down a displayed screen by as many as unprocessed downward scroll command signals; and a display control means for at least counting the number of aforementioned unprocessed upward or downward scroll command signals and driving the screen moving-up means in the case of upward scroll command signals or the screen moving-down means in the case of downward scroll command signals.

As a result, by using the microcomputer in conjunction with components such as a communication mechanism unit, a memory unit for storing received messages, an input device operated for entering inputs, an image displaying unit for displaying information such as a message and a power-supply circuit, it is possible to implement a portable radio information terminal having a simple configuration for executing functions: to carry out the scroll processing as batch processing without displaying an intermediate screen image for each intermediate scroll operation until the last scroll operation, allowing only the final screen image to be displayed; and to reduce the magnitudes of loads borne by the central processing unit, the image displaying unit and a peripheral circuit.

BRIEF DESCRIPTION OF THE DRAWINGS

FIG. 7 is a diagram showing a layout of a LUT (Lookup Table) and an image file in the working memory unit;

DETAILED DESCRIPTION OF THE PREFERRED EMBODIMENTS

The present invention will become more apparent from the following detailed description of some preferred embodiments with reference to the accompanying diagrams. It should be noted that the embodiment described below is no more than a preferred example showing the essential configuration and operation of the present invention. Thus, the embodiment may have limitations which are desirable from the technological-configuration point of view. However, the scope of the present invention is not limited to the embodiment unless otherwise specified explicitly in a description to limit the scope of the present invention.

Figure 1:
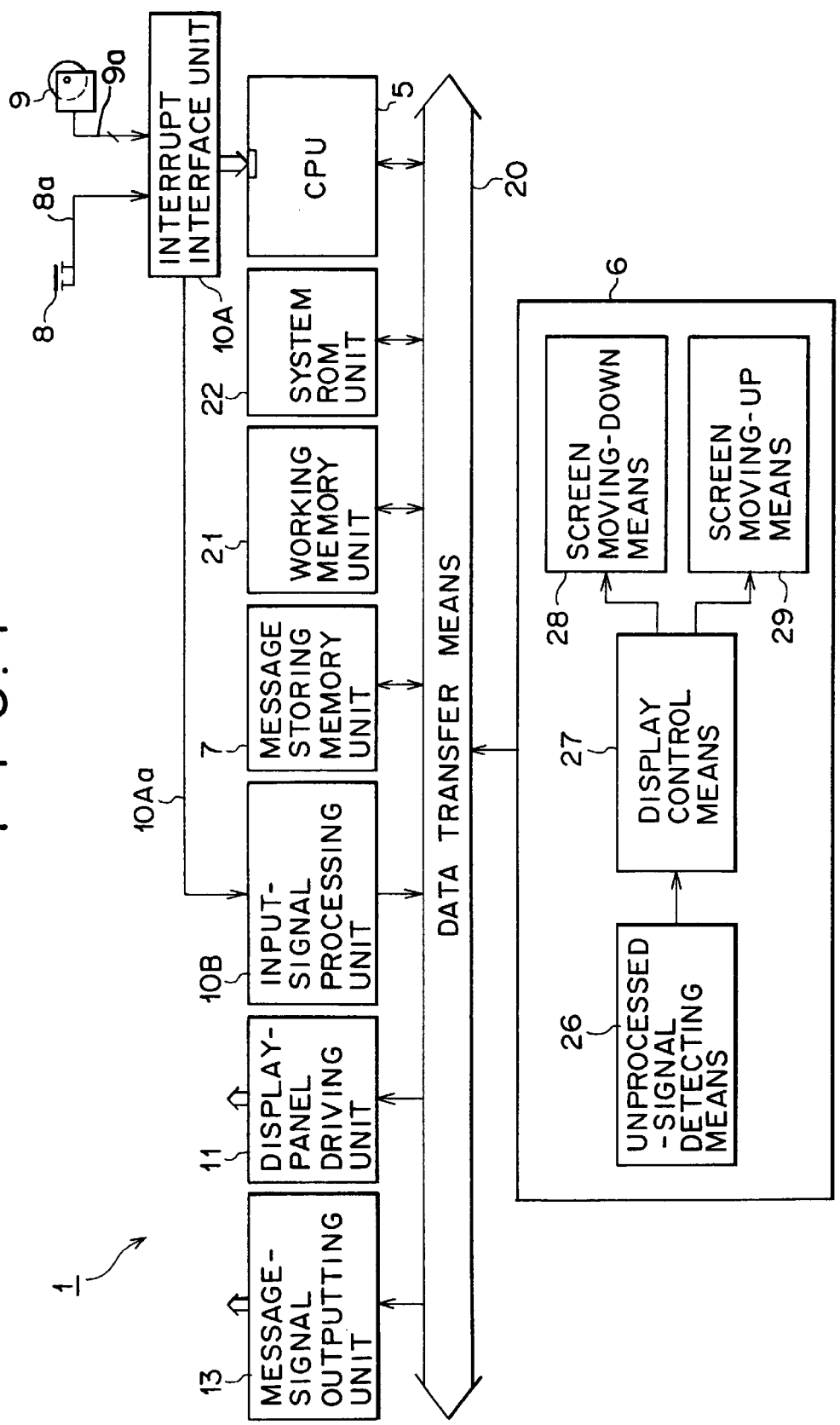
FIG. 1 is a block diagram showing the configuration of main components composing a pager serving as a portable radio information terminal implemented by a first embodiment of the present invention.
Figure 2:
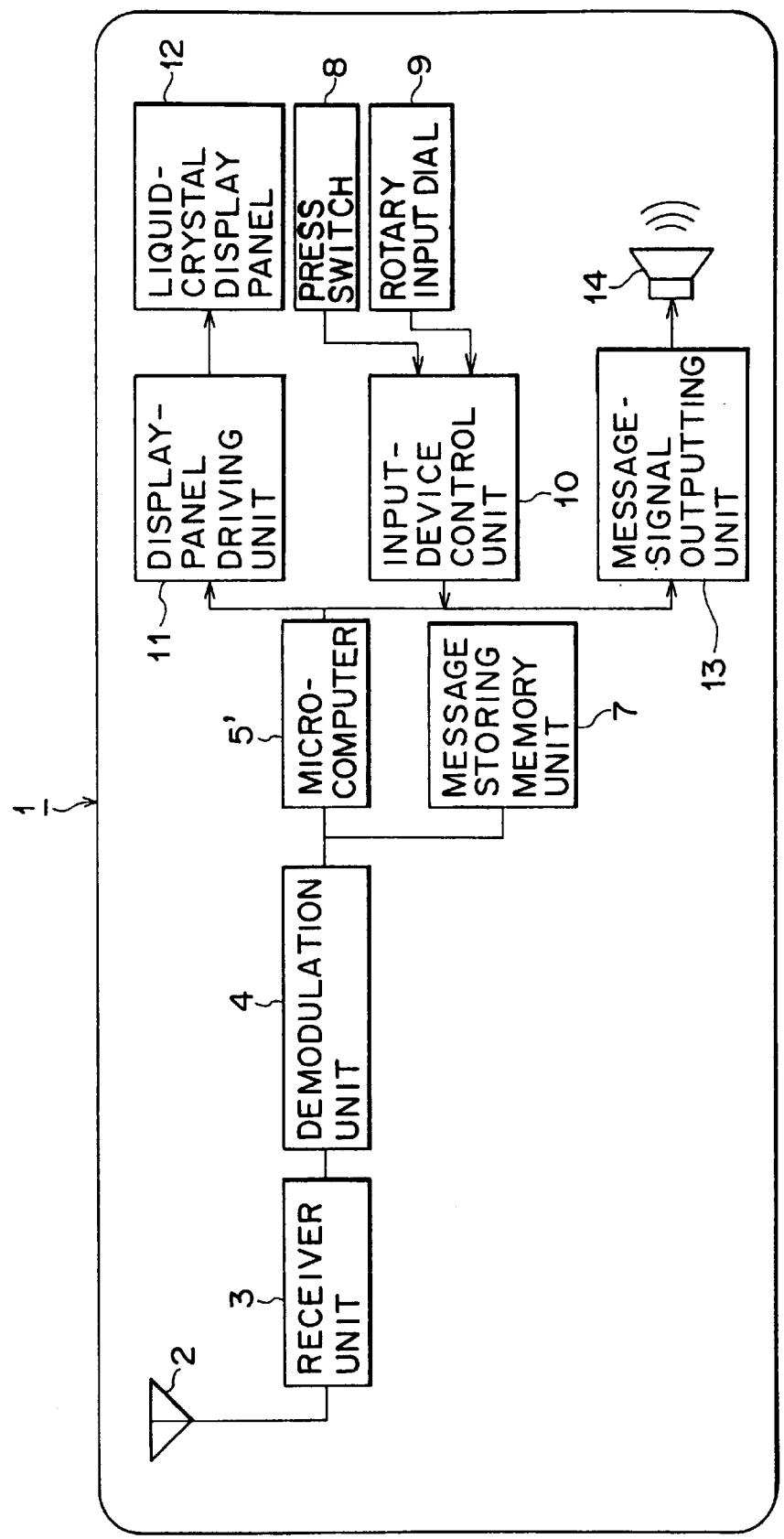
FIG. 2 is a block diagram showing a complete configuration of the portable radio information terminal shown in FIG. 1.
Figure 3:
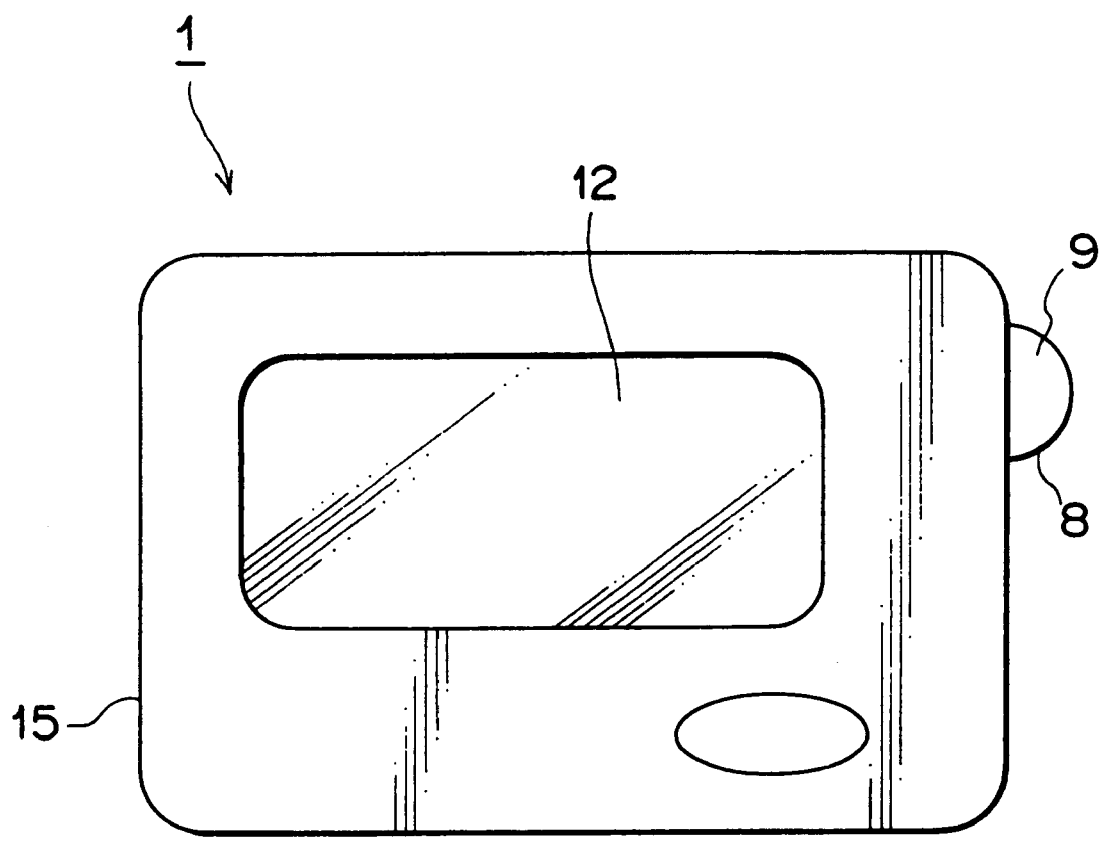
FIG. 3 is a diagram showing a front view of the external appearance of the portable radio information terminal shown in FIGS. 1 and 2.

FIG. 1 is a block diagram showing the configuration of main components composing a portable radio information terminal implemented by a first embodiment of the present invention. FIG. 2 is a block diagram showing a complete configuration of the portable radio information terminal employing the microcomputer shown in FIG. 1. FIG. 3 is a diagram showing a front view of the external appearance of the portable radio information terminal shown in FIGS. 1 and 2.

Used as a pager, the portable radio information terminal 1 provided by the present invention serves as a communication means which comprises an antenna 2, a receiver unit 3 and a demodulation unit 4 as shown in FIG. 2. The antenna 2 receives a radio wave conveying an information signal from a transmitter such as a radio base installed at a remote location. Connected to the antenna 2, the receiver unit 3 amplifies and detects the signal received by the antenna 2. Connected to the receiver unit 3, the demodulation unit 4 serves as a decoder for decoding a signal output by the receiver unit 3 to produce code information.

In addition, the demodulation unit 4 also has an A/D converter for generating digital information. The demodulation unit 4 further has a function to compare the code information obtained as a result of decoding with an ID code to form a judgment as to whether or not the received information signal is indeed a signal destined for this portable radio information terminal 1. The ID code is recorded in advance in an ID memory unit implemented typically by an EEPROM. It should be noted that the ID memory unit itself is not shown in the figure. A signal output by the demodulation unit 4 is supplied to a microcomputer 5'.

The microcomputer 5' is further connected to a message storing memory unit 7 which is implemented typically by an SRAM.

The microcomputer 5' is a component for carrying out data processing and input/output processing. To put it in detail, the microcomputer 5, executes a variety of programs or executable procedures stored in advance in ROM units internal or external to the microcomputer 5' to read in an input signal received from an input device to be described later, to write data into a file on the message storing memory unit 7, to create or update a TOC (Table of Contents), to read out a file from the message storing memory unit 7 and to control all operations of the portable radio information terminal 1 including an operation to display information such as a message indicating existence of an incoming signal and warnings including an alarm indicating a voltage abnormality on a display screen.

A message included in the code information produced by the demodulation unit 4 from a received signal is written and stored in the message storing memory unit 7. The message is read out back from the message storing memory unit 7 to be displayed on a display screen. The message storing memory unit 7 can also be implemented by a non-volatile storage device such as a flash memory and an EEPROM in addition to the SRAM described above.

Operated by the user, the input device mentioned above comprises a rotary input device 9 and a press switch 8 forming a single assembly with the rotary input device 9.

The rotary input device 9 and the press switch 8 are connected to an input-device control unit 10 which is connected to the microcomputer 5'.

Signals generated by these input devices are supplied to the microcomputer 5' by way of the input device control unit 10.

The microcomputer 5' is connected to a display-panel driving unit 11. Also connected to the display-panel driving unit 11 is a liquid-crystal display panel 12 for displaying a screen. The display-panel driving unit 11 and the liquid-crystal display panel 12 form an image displaying unit.

A display signal output by the microcomputer 5' is transmitted to the display-panel driving unit 11 which supplies a driving signal to the liquid-crystal display panel 12. Driven by the driving signal, the liquid-crystal display panel 12 forms a screen.

Figure 6:
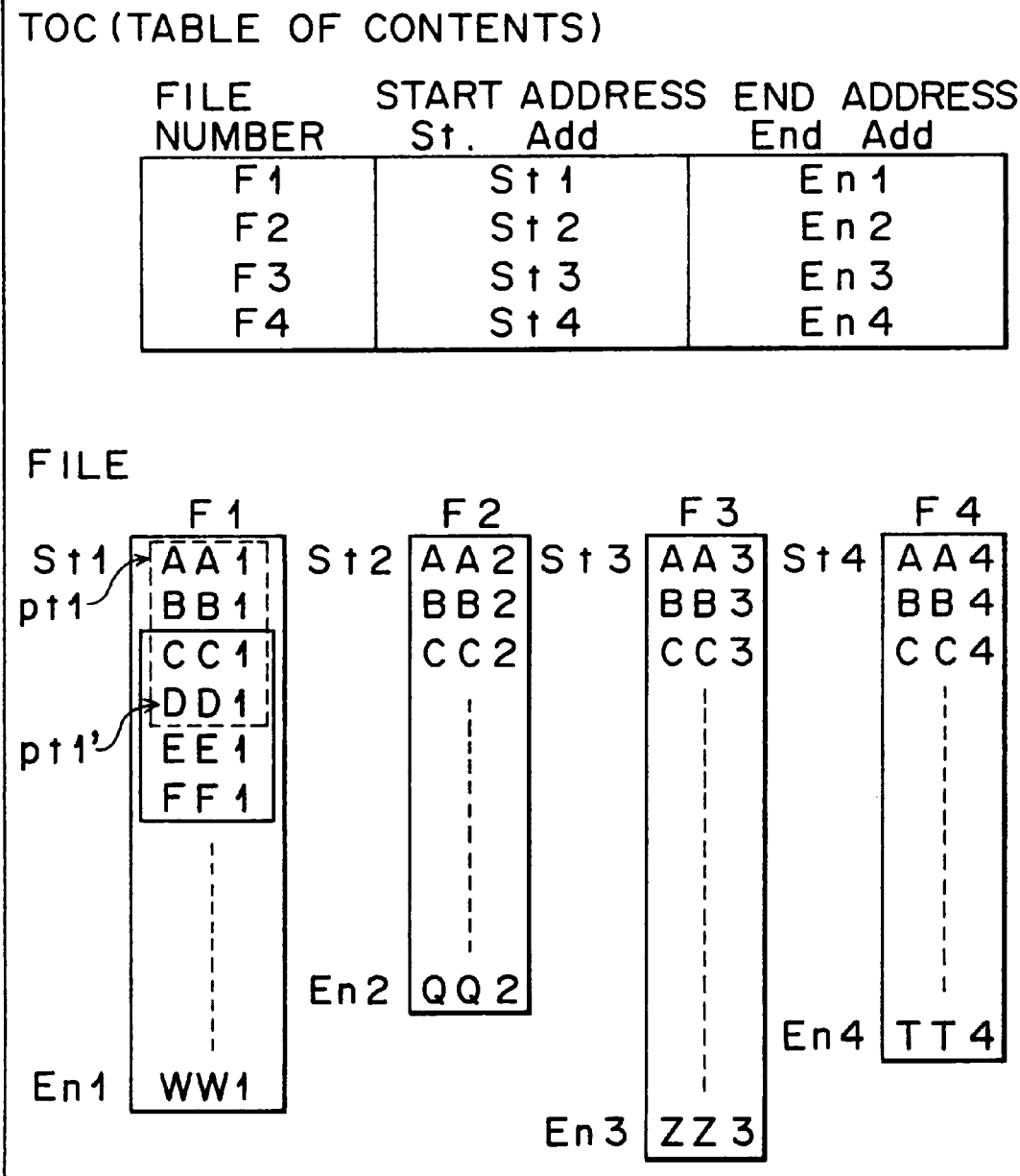
FIG. 6 is a diagram showing a layout of a TOC (Table of Contents) and message files in the message storing memory unit.

In the display-panel driving unit 11, the display signal is transferred to an image file IF shown in FIG. 6 as a display image. The image file IF is an area in an embedded working memory. The driving signal is generated on the basis of the display image.

It should be noted that the image file IF can also be implemented by a special-purpose memory VRAM (Video RAM) which is not shown in the figure.

The microcomputer 5' is also connected to a message-signal outputting unit 13 which is connected to a speaker 14 used as an audio-message device.

The microcomputer 5' outputs an operation signal to drive the speaker 14 by way of the message-signal outputting unit 13 for converting the operation signal into an audio signal for driving the speaker 14. It should be noted that a buzzer can also be used in place of the speaker 14.

The microcomputer 5', the input-device control unit 10 and other components described above constitute a control means. Main components of the microcomputer 5' shown in FIG. 1 are described as follows.

As shown in the figure, connected to a data bus serving as a data transfer means 20 are components such as the CPU 5, a working memory unit 21, a system ROM unit 22, a ROM unit 6, the message storing memory unit 7, an input-signal processing unit 10B, the display-panel driving unit 11 and the message-signal outputting unit 13.

Thus, the CPU 5 is capable of exchanging data with the working memory unit 21, the system ROM unit 22, the ROM unit 6, the message storing memory unit 7, the input-signal processing unit 10B, the display-panel driving unit 11 and the message-signal outputting unit 13 through the data transfer means 20.

The system ROM unit 22 is used for storing a variety of control procedures for controlling all operations of the portable radio information terminal 1 as programs executable by the CPU 5.

On the other hand, the ROM unit 6 is used for storing mainly a variety of application programs executable by the CPU 5. The ROM unit 6 is implemented by a storage device such as a read-only MOS memory or a flash memory.

Implemented typically by a RAM, the working memory unit 21 is used for storing temporary data resulting from processing carried out by the CPU 5. The working memory unit 21 can also be used as a tentative storage area for storing a lookup table (LUT).

An rotary input signal 9a and an on/off input signal 8a generated by the rotary input device 9 and the press switch 8 respectively are each converted by an interrupt interface unit 10A into an interrupt signal supplied to the CPU 5 by way of an interrupt receiving terminal of the CPU 5.

In this configuration, when the input signal 9a or the input signal 8a is generated as a result of an operation carried out on the rotary input device 9 or the press switch 8, an interrupt signal is supplied by the interrupt interface unit 10A to the CPU 5, causing the CPU 5 to transit to an interrupt processing phase.

Figure 5:
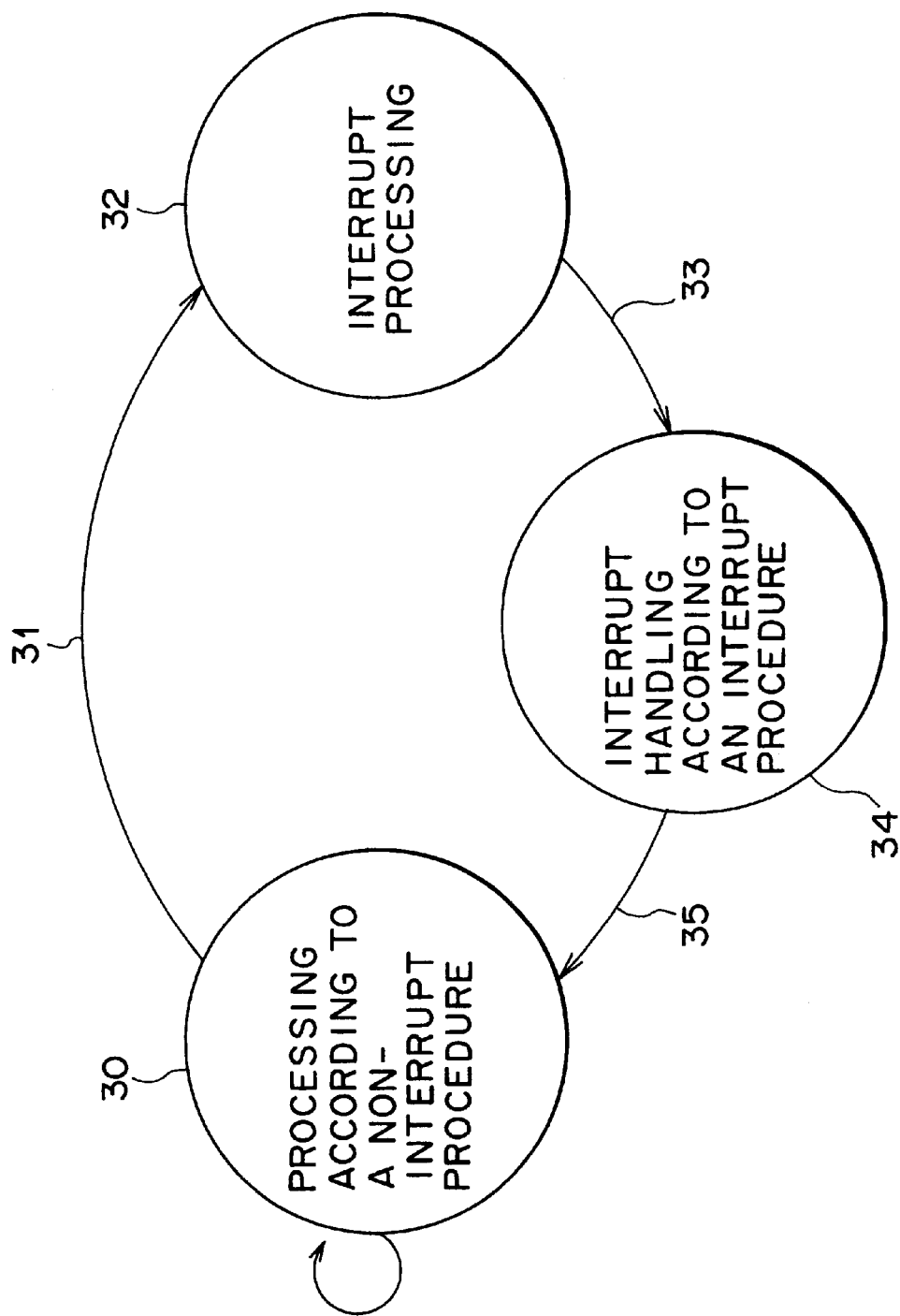
FIG. 5 is a state-transition diagram showing a process to transit to an interrupt handling procedure in the event of an interrupt generated by the input device.

FIG. 5 is a state-transition diagram showing a process to transit to an interrupt handling procedure in the event of an interrupt generated by the input device. The process begins with a state of processing 30 according to a non-interrupt procedure. In the event of an interrupt signal generated in this state 30, a state of the interrupt generation 31 is detected by the CPU 5 and the portable radio information terminal 1 transits to a state of processing the interrupt signal 32. In this state 32, an interrupt signal is processed in accordance with an interrupt-signal processing procedure stored in the system ROM unit 22. This procedure begins with identification of an input device that has generated the interrupt signal. An input device generating the interrupt signal can be identified directly from an interrupt receiving terminal that receives the interrupt signal or from information conveyed by the input signal 10Aa supplied by the interrupt interface unit 10A to the interrupt-signal processing unit 10B.

After an input device generating the interrupt signal has been identified as described above, that is, after an input device operated by the user has been identified, a state transition 33 shown in FIG. 5 occurs from the interrupt-signal processing state 32 to an interrupt handling state 34. In the state 34, an interrupt handling procedure associated with the identified input device is read out from the system ROM unit 22 to be followed in execution of processing to handle the interrupt. Normally, data such as a value entered by the user via the identified input device is confirmed in this processing. At the end of this processing, a transition 35 occurs from the state 34 to the state 30 in which the CPU 5 resumes the non-interrupt processing which has been interrupted by the occurrence of the interrupt 31. In this resumed processing, the data entered via the interrupting input device can be used.

Next, the rotary input device 9 and the press switch 8 are explained.

Figure 4:
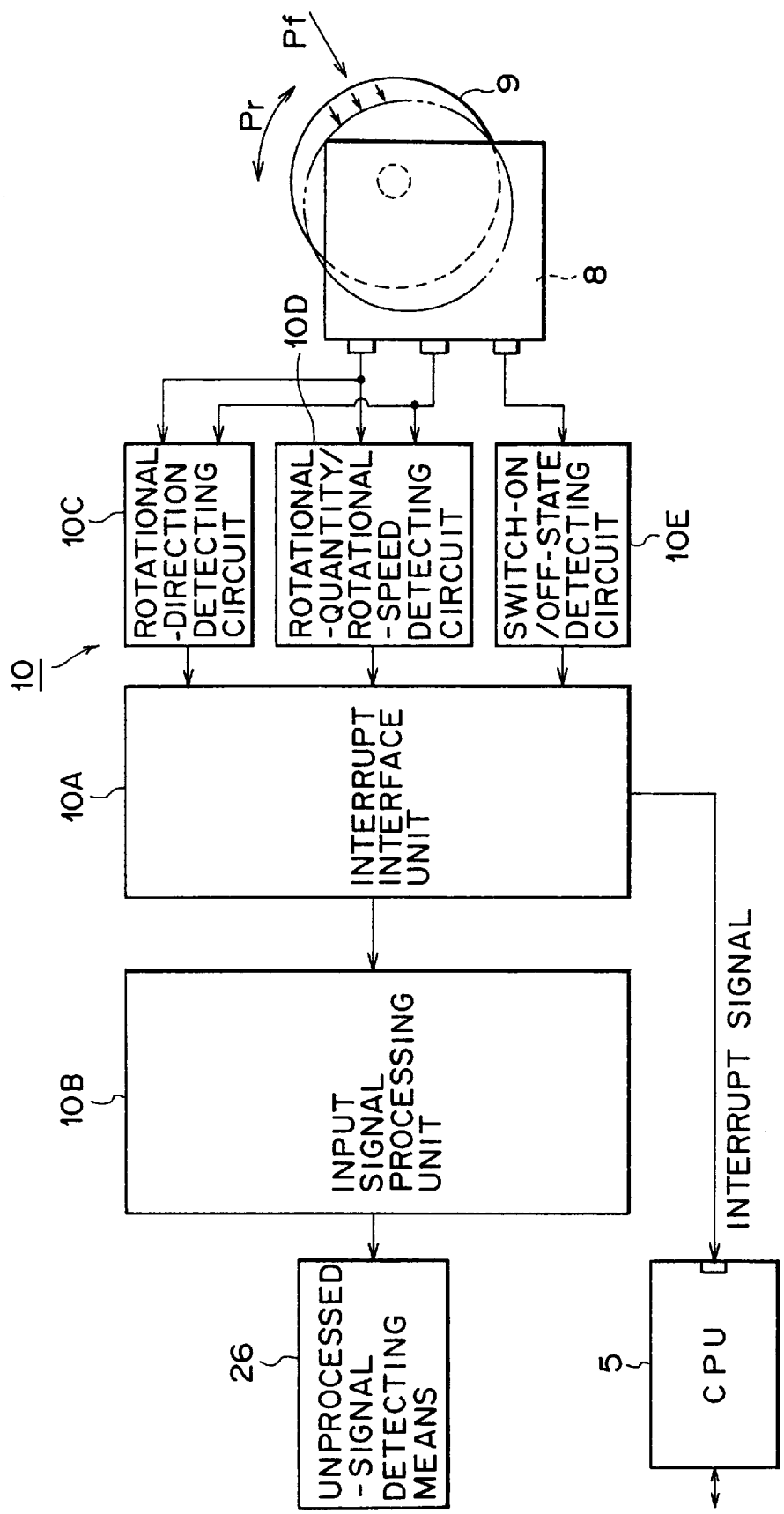
FIG. 4 is a diagram showing a typical configuration of a rotary/press input device and employed in the portable radio information terminal provided by the present invention.

FIG. 4 is a diagram showing a typical configuration of the rotary input device 9, the press switch 8 and the input-device control unit 10. As shown in the figure, the rotary input device 9 and the press switch 8 are built into a single assembly.

The rotary input device 9 has a knob which can be rotated freely in a direction indicated by an arrow Pr. When an input operation is carried out by rotating the rotary input device 9 in the clockwise or counterclockwise direction, a signal dependent on the direction is generated.

When the knob is pressed in a direction indicated by an arrow Pf, the press switch 8 is put in an turned-on or turned-off state, outputting a signal representing this state to a terminal.

Information on the rotational direction of the knob of the rotary input device 9 is detected by a rotational-direction detecting circuit 10C employed in the input-device control unit 10 through a terminal as a signal which is then supplied to an interrupt interface unit 10A. The interrupt interface unit 10A in turn generates an interrupt signal based on the signal supplied thereto and forms a signal 10Aa shown in FIG. 1. The signal 10Aa conveying the information on the rotational direction is supplied to the input-signal processing unit 10B.

The input-signal processing unit 10B passes on the signal 10Aa to the data transfer means 20 immediately as it is or after holding the signal 10Aa.

The information is used in execution of a unprocessed-signal detecting means 26 for detecting an unprocessed signal generated by the rotary input device 9. It should be noted that this means is stored in the system ROM unit 6.

In the case of an input-signal processing unit 10B that outputs the signal 10Aa immediately without holding it, the information on the rotational direction of the knob is used only once. That is to say, an operation carried out on the knob corresponds to one execution of processing.

In the case of an input-signal processing unit 10B that outputs the signal 10Aa after holding it, on the other hand, the information on the rotational direction of the knob can be used repeatedly. That is to say, with the knob put in a state of being rotated continuously, processing is carried out repetitively.

In addition, information on the rotational quantity and the rotational speed of the knob of the rotary input device 9 is supplied to a rotational-quantity/rotational-speed detecting circuit 10D employed in the input-device control unit 10 through a terminal as a signal which is then similarly supplied to the interrupt interface unit 10A as shown in FIG. 4. The information is used in processing carried out thereafter.

As shown in FIG. 4, on/off information generated by the press switch 8 is supplied to a switch-on/off-state detecting circuit 10E employed in the input-device control unit 10 through a terminal as a signal which is then likewise supplied to the interrupt interface unit 10A.

In addition, the rotary input device 9 and the press switch 8 are designed so that they can be operated independently of each other. They can also be operated simultaneously as well.

Implemented typically by a jog dial or a rotary encoder, the rotary input device 9 functions as an input device operated by the user for supplying a command signal for controlling operations in general including a change command signal to change a number displayed on the screen. On the other hand, the press switch 8 described above functions as an input device operated by the user for supplying a signal used mainly for confirming a displayed number and typically for causing the operation of the portable radio information terminal 1 to transit from a mode to another.

Next, a variety of means stored in the ROM unit 6 are explained by referring to FIG. 1.

As shown in the figure, an unprocessed-signal detecting means 26, a display control means 27, a screen moving-down means 28 and a screen moving-up means 29 are each stored in the ROM unit 6 as a program, that is, a procedure that can be executed by the CPU 5. The unprocessed-signal detecting means 26 is capable of detecting unprocessed upward or downward scroll command signals generated by the rotary input device 9. The display control means 27 counts the number of unprocessed downward or upward scroll command signals detected by the unprocessed-signal detecting means 26 and drives the screen moving-down means 28 in the case of unprocessed downward scroll command signals or the screen moving-up means 29 in the case of unprocessed upward scroll command signals. The screen moving-down means 28 moves down a displayed screen by as many lines as detected unprocessed downward scroll command signals while the screen moving-up means 29 moves up a displayed screen by as many lines as detected unprocessed upward scroll command signals.

Any program format can be used for prescribing the means described above as long as the program can be executed directly or indirectly. It is thus desirable to adopt an absolute-binary addressing format even though a relocatable-binary format which needs readdressing at execution time is also acceptable. In the case of the latter format, however, it is necessary to keep a linkage means in the system ROM unit 22 as a resident tool.

The configuration of the portable radio information terminal implemented by the embodiment is explained by referring to FIG. 3.

FIG. 3 is a diagram showing a front view of the external configuration of the portable radio information terminal implemented by the embodiment.

The portable radio information terminal 1 implemented by the embodiment is accommodated in a thin hexahedron cabinet 15. At about the center of the front face of the cabinet 15, there is provided a liquid-crystal display panel 12 for displaying a message, a date and/or the time of the day. At the upper right corner of the cabinet 15, a jog dial used as the rotary input device 9 described earlier is installed in such a way that a portion of the jog dial protrudes outward from the cabinet 15 to the external side. The rotary input device 9 has a knob which can be rotated in the clockwise and counterclockwise directions with a high degree of freedom.

A press switch 8 is assembled with the rotary input device 9 as a single assembly. When the knob of the rotary input device 9 is pressed, the press switch 8 is put in a turned-on or turned-off state.

On the liquid-crystal display panel 12, it is possible to display a message text composed of up to typically 4 lines each comprising a maximum of typically 20 alphabetical and numerical characters.

The configuration of the portable radio information terminal 1 implemented by the embodiment has been described so far. Next, the operation of the portable radio information terminal 1 is explained as follows.

First of all, normal operations to receive a radio signal and to display a message are discussed by referring mainly to FIG. 2.

When an electric wave conveying information or a message destined for a specific portable radio information terminal 1 is transmitted from a radio transmitting station, the portable radio information terminal 1 receives the radio wave using the antenna 2. In the receiver unit 3, the radio wave is subjected to signal processing such as conversion into a signal having an intermediate frequency, amplification and detection. In the demodulation unit 4, after the fact that the message is indeed destined for the portable radio information terminal 1 has been confirmed, the received information signal is decoded. The decoded information signal is finally stored in the message storing memory unit 7 in an operation controlled by the microcomputer 5'.

The CPU 5 employed in the microcomputer 5' controls the operation of the portable radio information terminal 1 by execution of control programs stored in the ROM unit 6. First of all, the CPU 5 forms a judgment as to whether or not an information signal has been received. If an information signal is judged to have been received, the display-panel driving unit 11 is operated to display a message of the received information signal read out from the message storing memory unit 7 on the liquid-crystal display panel 12 as a text composed of up to typically 4 lines each comprising a maximum of typically 20 alphabetical and numerical characters.

In addition, when an information signal is judged to have been received, the microcomputer 5' issues a command to operate the message-signal outputting unit 13. Operated by the command, the message-signal outputting unit 13 supplies an alarm signal to the speaker 14 to generate sound for making the user aware of the fact that an information signal has been received.

Being aware of the fact that an information signal has been received, the user reads a message displayed on the liquid-crystal display panel 12. If the message can not be all displayed on the screen of the liquid-crystal display panel 12 which is capable of accommodating up only to 4 lines each comprising a maximum of 20 alphabetical and numerical characters, the user is allowed to scroll the displayed screen in order to display all the entire message.

Next, generation of a message file and formation of an image file are explained. FIG. 6 is a diagram showing a layout of a TOC (Table of Contents) and message files in the message storing memory unit 7 and FIG. 7 is a diagram showing a layout of a LUT (Lookup Table) and an image file in the working memory unit 21.

Each time an information signal is received and demodulated, a message file such as F1, F2, F3, F4 or the like is generated on a file area in the message storing memory unit 7. Each message file Fi contains a message text between a start address Sti and an end address Eni. In addition, the message file Fi also includes attribute and control records of the file which are neither shown in the figure nor explained in the following description.

The message file F1 has a start address St1 and an end address En1. Likewise, the message files F2, F3 and F4 have start addresses St2, St3 and St4 respectively and end addresses En2, En3 and En4 respectively.

Thus, each piece of data in a message text in each message file Fi has an address in the message storing memory unit 7. In the case of the message file F1, for example, the first piece of data is 3 characters AA1 each occupying 1 byte and a space also occupying 1 byte to give a total of 4 bytes as shown in FIG. 6.

The address of the first character A in this first piece of data is the start address St1 of the message file F1 which is expressed in the decimal format.

Similarly, the second piece of data is 3 characters BB1 each occupying 1 byte and a space also occupying 1 byte. The address of the first character B in this second piece of data is an address (St1+4) expressed in the decimal format. The address of the space of the fourth piece of data is an address (St1+15).

Each row of the TOC (Table of Contents) created in the message storing memory unit 7 contains a file number, a start address and an end address of a message file Fi. Thus, each time a message file Fi is deleted or generated, the contents of the TOC are updated.

In an operation to make an access to a target message file specified by a file number, first of all, the TOC is searched for a start address on the same row as the file number of the target message file. Then, data at the start address in the message storing memory unit 7 is then read out.

As shown in FIG. 7, on the other hand, each row of the LUT (Lookup Table) created on the working memory unit 21 includes a file number and an entry point pti of each message file Fi. The entry point pti of a message file Fi is the address of data of the message file Fi that has been displayed most recently or currently displayed on the screen.

In the example shown in FIG. 7, the entry point of the message file F1 is pt1'. In the example shown in FIG. 6, the entry point pt1' is the address of the first piece of data CC1 of the message text stored in the message file F1. An entry point pti stored in the LUT is thus dynamically changed in processing such as a scroll operation.

An IF (image file) corresponding to a VRAM is also created on the working memory unit 21 shown in FIG. 7. A sequence of pieces of data stored in the IF is an image displayed on the screen. Thus, if the contents of the IF are changed partially, the screen is also updated accordingly.

Next, a downward scroll operation is explained.

Figure 8:
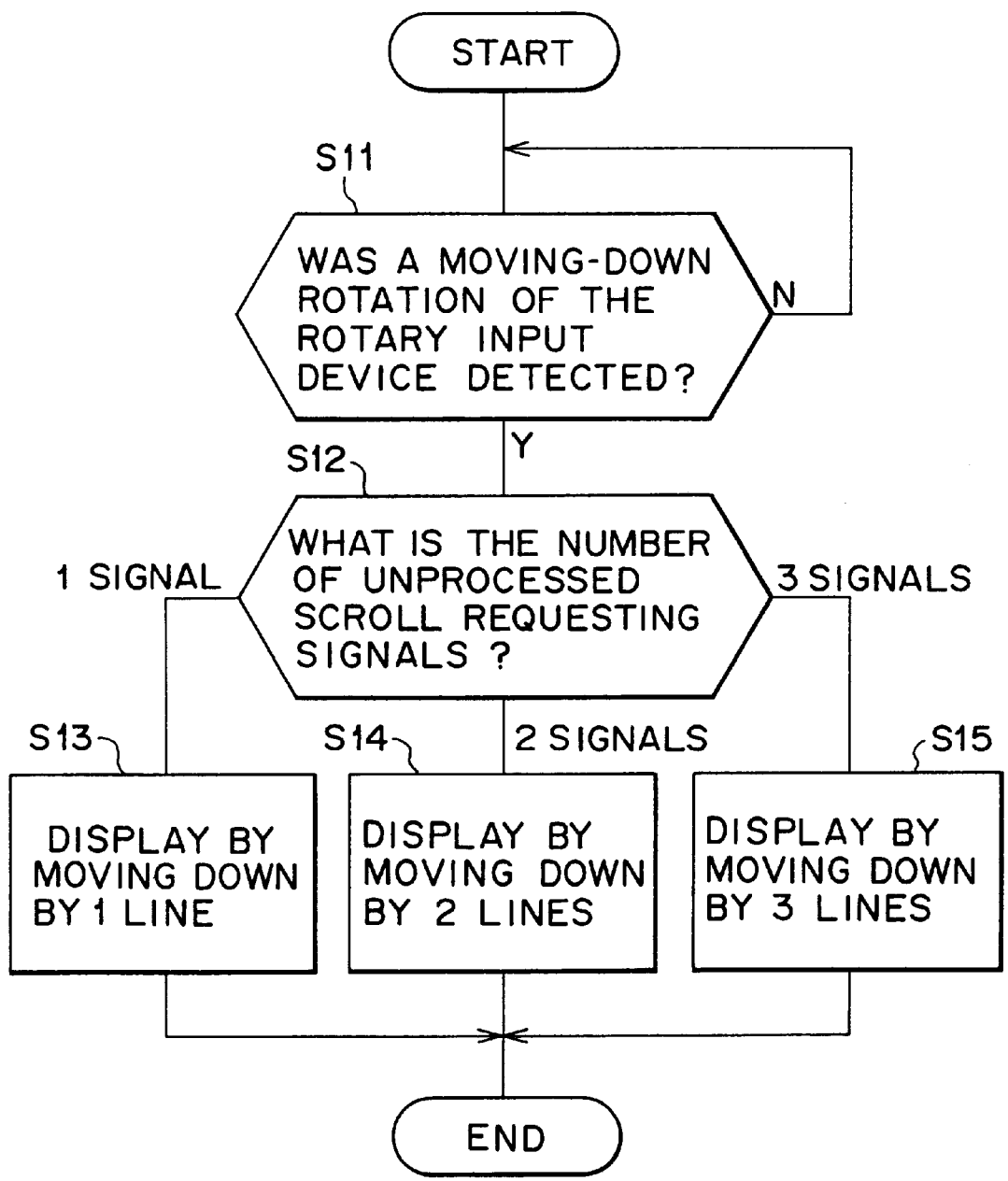
FIG. 8 shows a flowchart representing a downward scroll operation carried out by the portable radio information terminal implemented by the first embodiment of the present invention.

FIG. 8 shows a flowchart representing a downward scroll operation carried out by the portable radio information terminal implemented by the first embodiment of the present invention.

Figure 9:
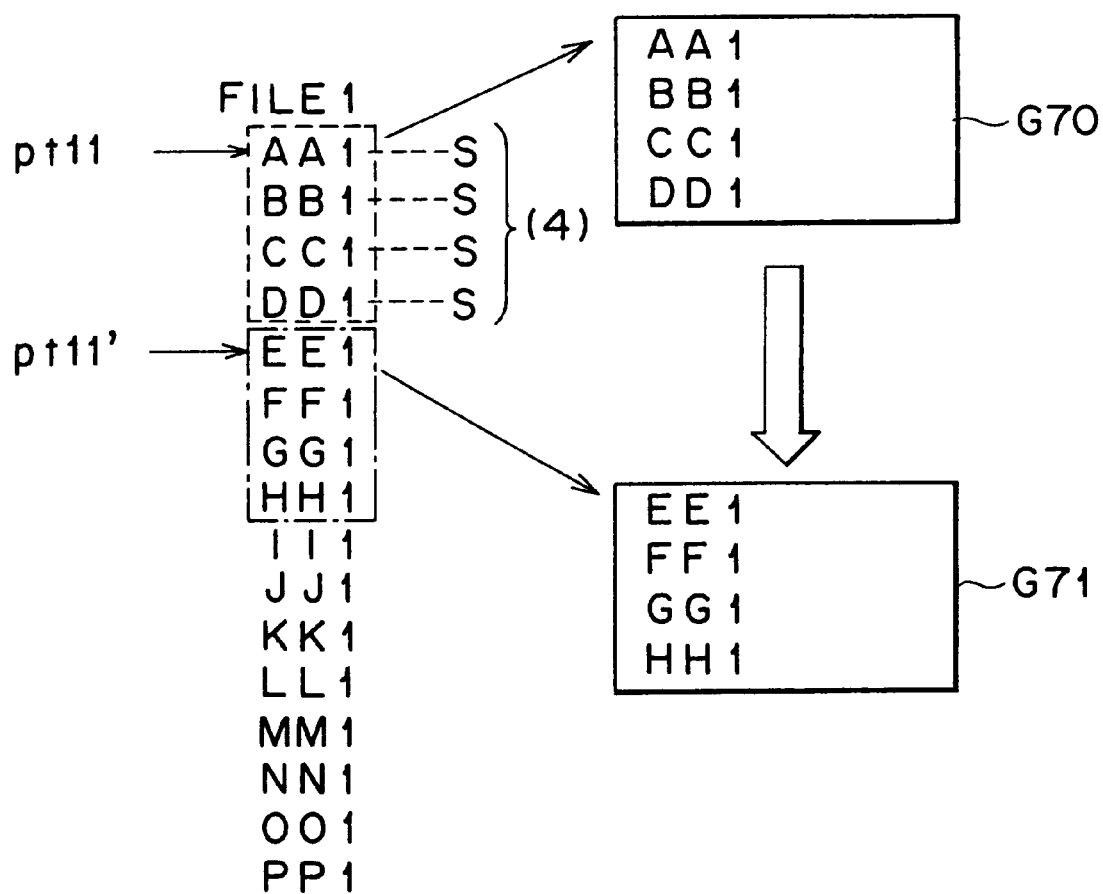
FIG. 9 is an explanatory diagram used for describing an example of processing to move down a displayed screen image carried out by the portable radio information terminal implemented by the first embodiment of the present invention.

FIG. 9 is an explanatory diagram used for describing an example of processing to move down a displayed screen image carried out by the portable radio information terminal implemented by the first embodiment of the present invention.

Figure 10:
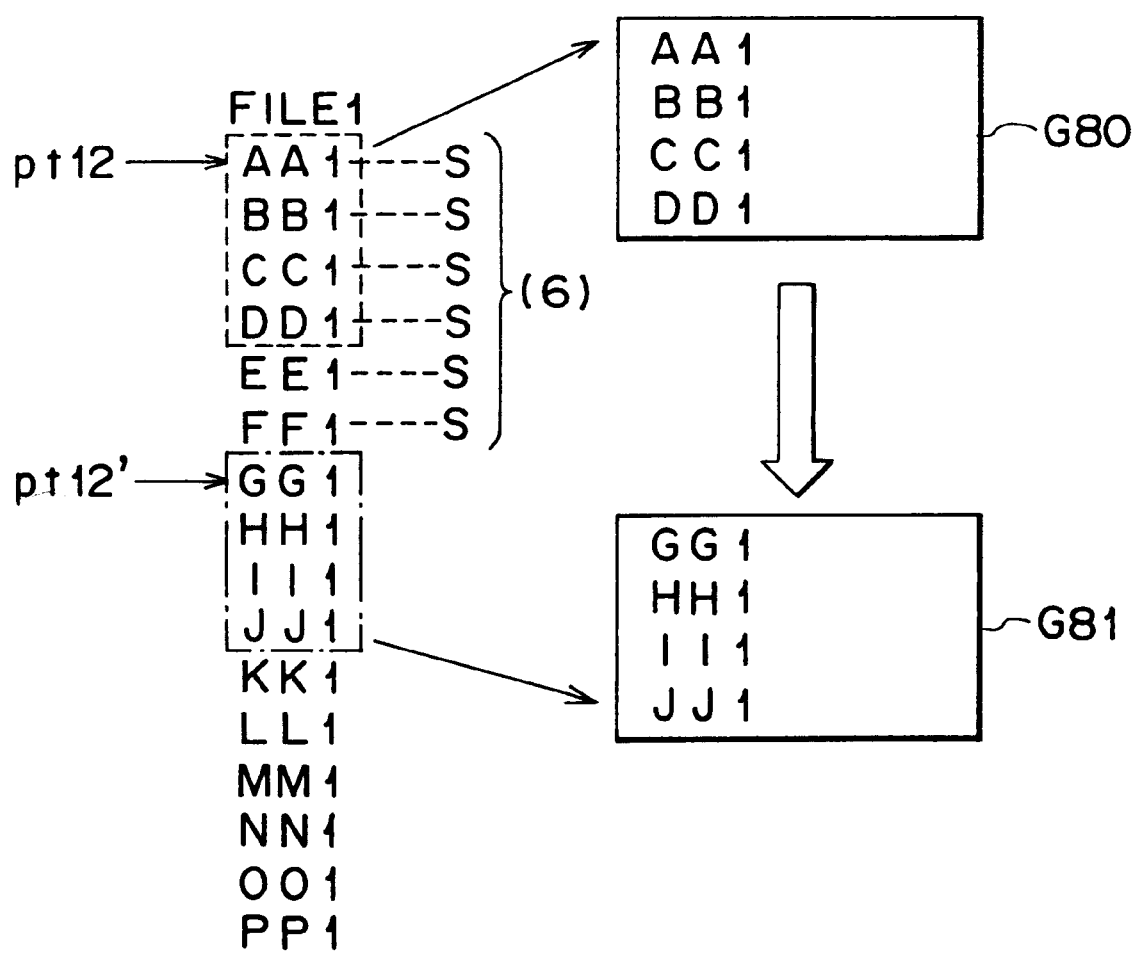
FIG. 10 is an explanatory diagram used for describing another example of processing to move down a displayed screen image carried out by the portable radio information terminal implemented by the first embodiment of the present invention.

FIG. 10 is an explanatory diagram used for describing another example of processing to move down a displayed screen image carried out by the portable radio information terminal implemented by the first embodiment of the present invention.

The downward scroll operation routine shown in FIG. 8 is invoked when a downward scroll command signal is generated by the rotary input device 9. As shown in the figure, the flowchart begins with a step S11 at which the CPU 5 executes the unprocessed-signal detecting means 26 stored in the system ROM unit 22 to verify that the unprocessed scroll command signal generated by the rotary input device 9 indeed requests a downward scroll operation. If the unprocessed scroll command signal indeed requests a downward scroll operation, the flow of the routine goes on to a step S12 at which the number of detected unprocessed scroll command signals is counted by the display control means 27.

Then, also at the step S12, the display control means 27 passes the number of signals to the screen moving-down means 28 and activates the screen moving-down means 28.

The screen moving-down means 28 is activated to move down the screen image stored in the image file IF in the working memory unit 21 by as many lines as unprocessed downward scroll command signals. If the number of unprocessed downward scroll command signals is 1, for example, the flow of the routine then proceeds to a step S13 at which the screen moving-down means 28 moves down the screen image stored in the image file IF in the working memory unit 21 by 1 line.

If the number of unprocessed downward scroll command signals is 2, the flow of the routine then proceeds to a step S14 at which the screen moving-down means 28 moves down the screen image stored in the image file IF in the working memory unit 21 by 2 lines.

If the number of unprocessed downward scroll command signals is 3, the flow of the routine then proceeds to a step S15 at which the screen moving-down means 28 moves down the screen image stored in the image file IF in the working memory unit 21 by 3 lines.

At the step S14 or S15, processing to display intermediate screen images by 1-line scroll operations executed a plurality of times is skipped. Instead, only the final screen image is displayed at once in a single display batch operation. In response to a request for a scroll operation to move a displayed screen image by a plurality of lines, it is thus no longer necessary for the CPU 5, the image displaying unit and the peripheral circuit to carry out processing to display an intermediate screen image for each 1-line scroll operation. As a result, the magnitude of the processing load borne by the CPU 5, the image displaying unit and the peripheral circuit is reduced.

Therefore, even if the processing speeds of the CPU and the image displaying unit are not high, they are capable of following up input operations requesting scroll processing carried out by the user at a high speed.

In the example described above, up to 3 unprocessed signals exist. It should be noted, however, that the number of unprocessed signals is not limited. It is needless to say that this screen scroll technique is capable of keeping up with any number of consecutive inputs or any number of unprocessed signals.

FIG. 9 is a diagram showing a downward scroll operation for 4 unprocessed signals. An initial screen image G70 starts at an entry point pt11 corresponding to a first piece of data AA1 of a first message text stored in a message file FILE1. The initial screen image G70 comprises 4 lines including the data AA1 at the entry point pt11.

Since the number of unprocessed signals is 4, the 1-line scroll operation will be carried out 4 times if the conventional technology is adopted. That is to say, the displayed screen image will be moved down over 4 lines, namely, the piece of data AA1 to a piece of DD1, sequentially 1 line after another. During the scroll operation, 5 screen images, that is, the initial screen image G70, 3 intermediate screen images and a final screen image G71, are displayed. With the present invention, on the other hand, the entry point pt11 is just shifted downward by 4 lines in a single display batch operation to the beginning of a piece of data EE1 pointed to by an entry point pt11'.

Thus, the entry point pt11' is newly cataloged in the LUT shown in FIG. 7 to update the previous entry point pt11. As a result, the final screen image G71 of 4 lines starting with the piece of data EE1 on the top line and ending with a piece of data HH1 on the bottom line is written into the image file IF as shown in FIG. 9.

That is to say, the final screen image G71 is displayed on the image displaying unit in a single display batch operation and the scroll processing is completed by this single display batch operation.

FIG. 10 is a diagram showing a downward scroll operation for 6 unprocessed signals. An initial screen image G80 starts at an entry point pt12 corresponding to a first piece of data AA1 of a first message text stored in a message file FILE1. The initial screen image G70 comprises 4 lines including the data AA1 at the entry point pt12.

Since the number of unprocessed signals is 6, the 1-line scroll operation will be carried out 6 times if the conventional technology is adopted. That is to say, the displayed screen image will be moved down over 6 lines, namely, the piece of data AA1 to a piece of FF1, sequentially 1 line after another. During the scroll operation, 7 screen images, that is, the initial screen image G80, 5 intermediate screen images and a final screen image G81, are displayed. With the present invention, on the other hand, the entry point pt12 is just shifted downward by 6 lines in a single display batch operation to the beginning of a piece of data GG1 pointed to by an entry point pt12'.

Thus, the entry point pt12' is newly cataloged in the LUT to update the previous entry point pt12. As a result, the final screen image G81 of 4 lines starting with the piece of data GG1 on the top line and ending with a piece of data JJ1 on the bottom line is written into the image file IF as shown in FIG. 10.

That is to say, the final screen image G81 is displayed on the image displaying unit in a single display batch operation and the scroll processing is completed by this single display batch operation.

Next, an upward scroll operation is explained.

Figure 11:
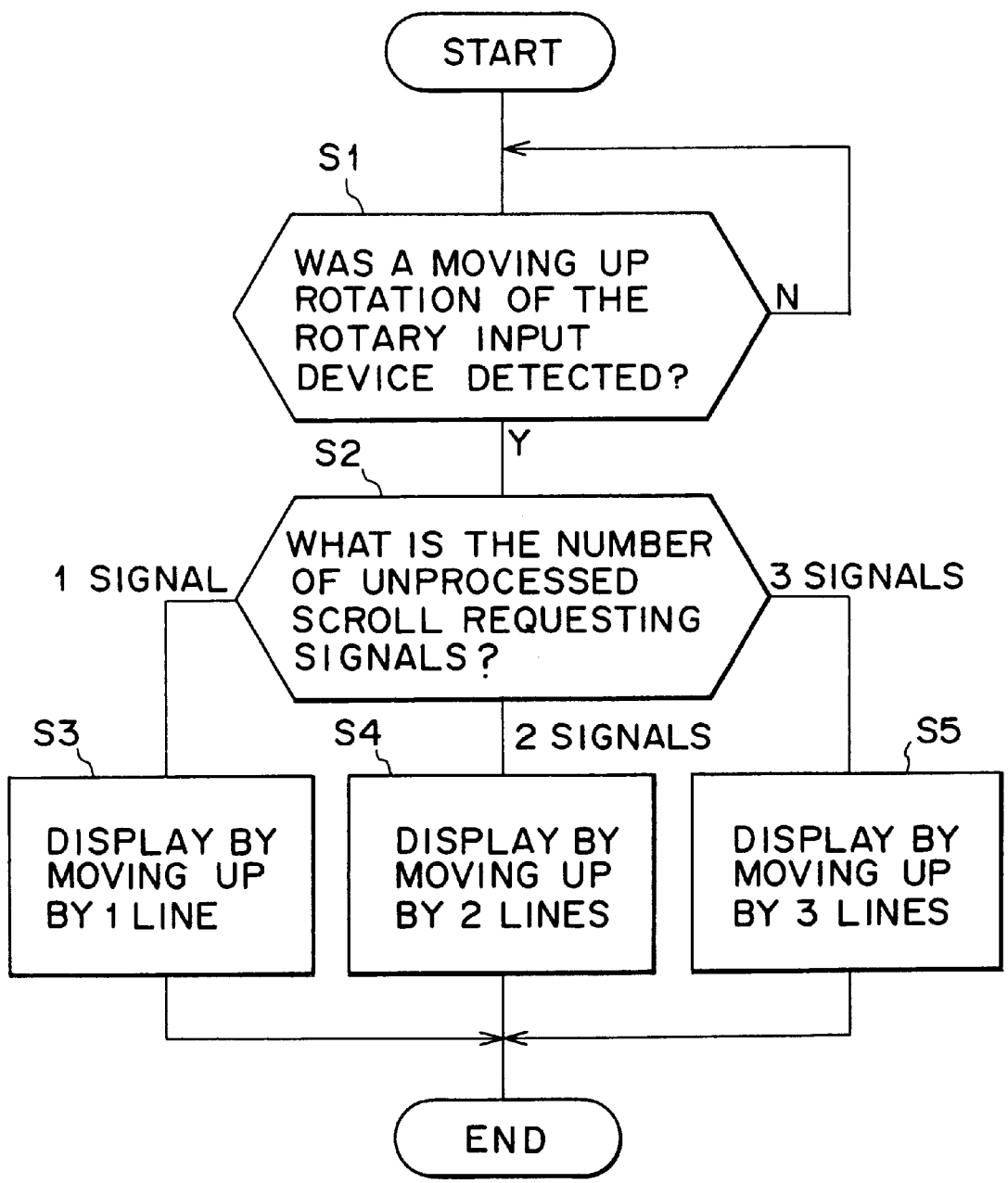
FIG. 11 shows a flowchart representing an upward scroll operation carried out by the portable radio information terminal implemented by the first embodiment of the present invention.

FIG. 11 shows a flowchart representing an upward scroll operation carried out by the portable radio information terminal implemented by the first embodiment of the present invention.

Figure 12:
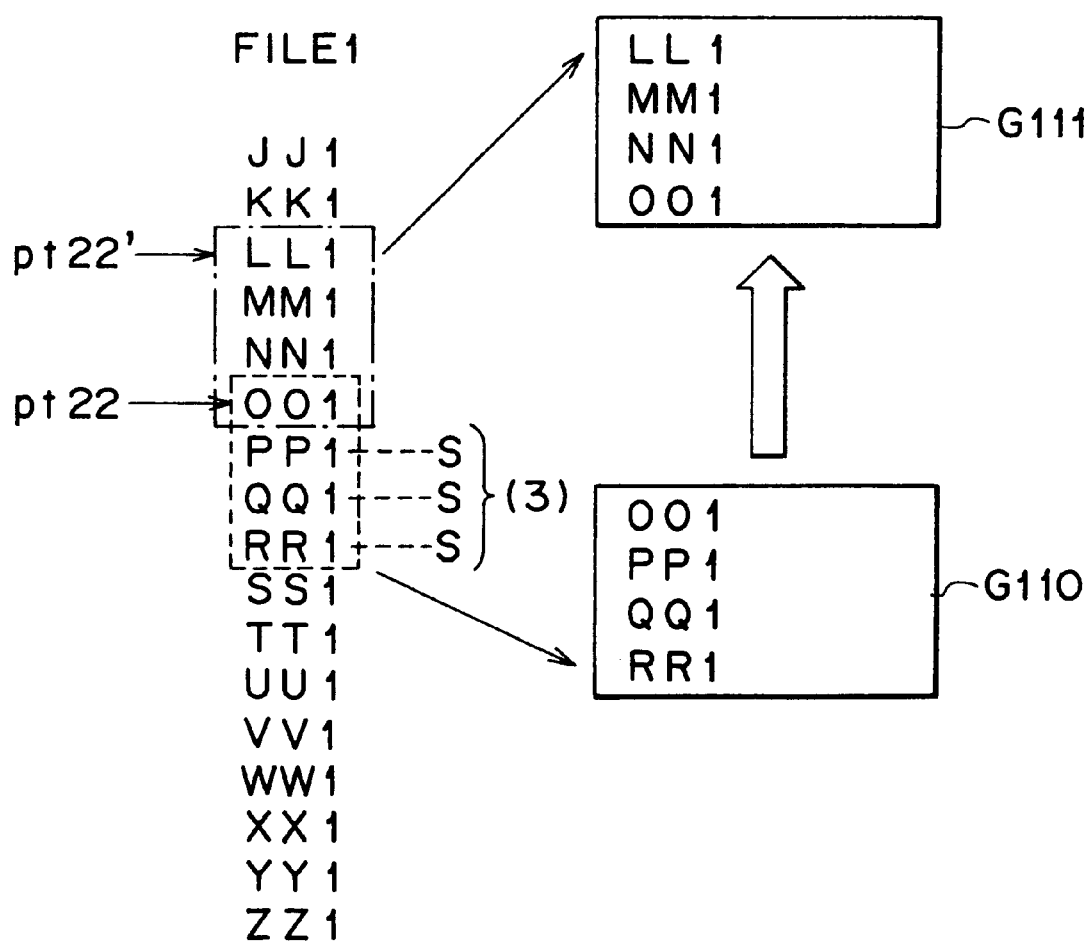
FIG. 12 is an explanatory diagram used for describing an example of processing to move up a displayed screen image carried out by the portable radio information terminal implemented by the first embodiment of the present invention.

FIG. 12 is an explanatory diagram used for describing an example of processing to move up a displayed screen image carried out by the portable radio information terminal implemented by the first embodiment of the present invention.

Figure 13:
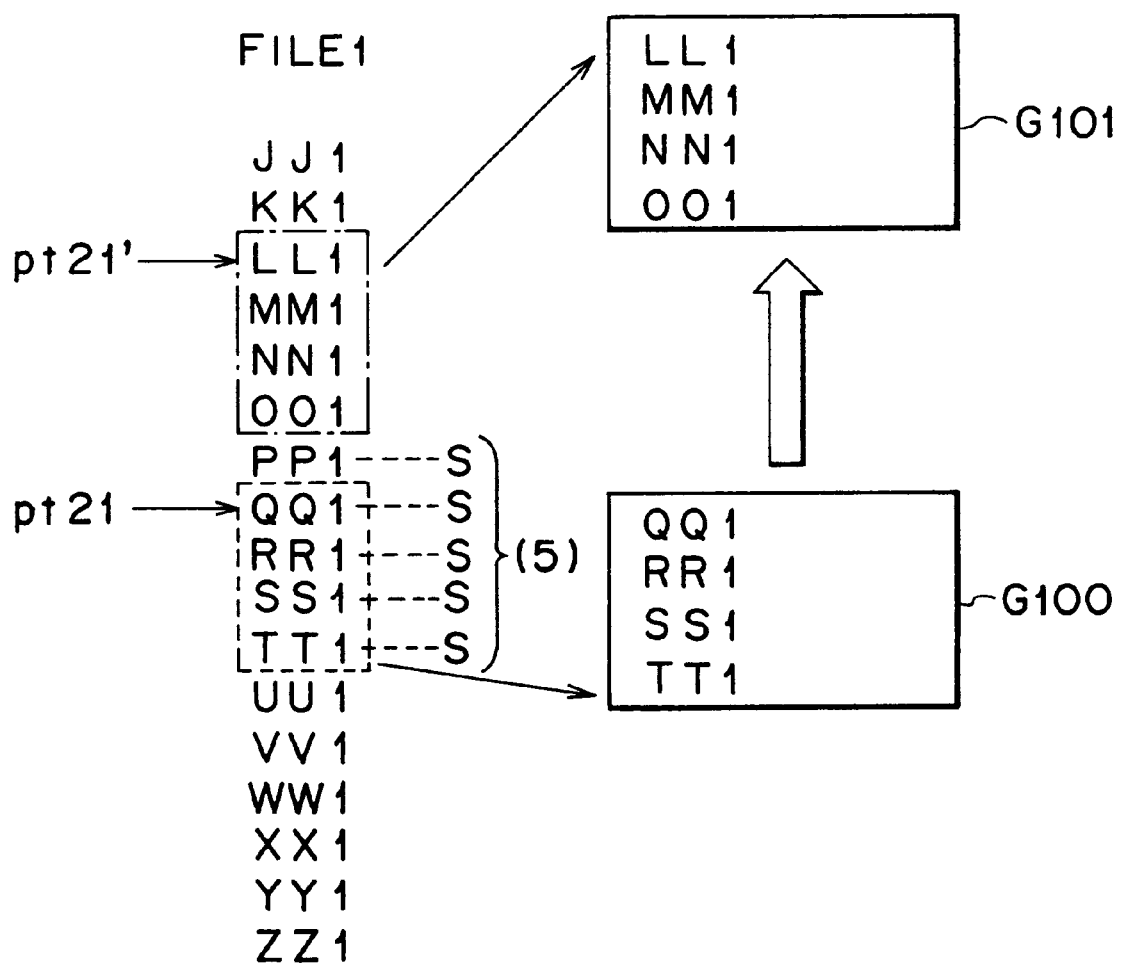
FIG. 13 is an explanatory diagram used for describing another example of processing to move up a displayed screen image carried out by the portable radio information terminal implemented by the first embodiment of the present invention.

FIG. 13 is an explanatory diagram used for describing another example of processing to move up a displayed screen image carried out by the portable radio information terminal implemented by the first embodiment of the present invention.

The upward scroll operation routine shown in FIG. 11 is invoked when an upward scroll command signal is generated by the rotary input device 9. As shown in the figure, the flowchart begins with a step S1 at which the CPU 5 executes the unprocessed-signal detecting means 26 stored in the system ROM unit 22 to verify that the unprocessed scroll command signal generated by the rotary input device 9 indeed requests an upward scroll operation. If the unprocessed scroll command signal indeed requests an upward scroll operation, the flow of the routine goes on to a step S2 at which the number of detected unprocessed scroll command signals is counted by the display control means 27.

Then, also at the step S2, the display control means 27 passes the number of signals to the screen moving-up means 29 and activates the screen moving-up means 29.

The screen moving-up means 29 is activated to move up the screen image stored in the image file IF in the working memory unit 21 by as many lines as unprocessed upward scroll command signals. If the number of unprocessed upward scroll command signals is 1, for example, the flow of the routine then proceeds to a step S3 at which the screen moving-up means 29 moves up the screen image stored in the image file IF in the working memory unit 21 by 1 line.

If the number of unprocessed upward scroll command signals is 2, the flow of the routine then proceeds to a step S4 at which the screen moving-up means 29 moves up the screen image stored in the image file IF in the working memory unit 21 by 2 lines.

If the number of unprocessed upward scroll command signals is 3, the flow of the routine then proceeds to a step S5 at which the screen moving-up means 29 moves up the screen image stored in the image file IF in the working memory unit 21 by 3 lines.

At the step S4 or S5, processing to display intermediate screen images by 1-line scroll operations executed a plurality of times is skipped. Instead, only the final screen image is displayed at once in a single display batch operation. In response to a request for a scroll operation to move a displayed screen image by a plurality of lines, it is thus no longer necessary for the CPU 5, the image displaying unit and the peripheral circuit to carry out processing to display an intermediate screen for each 1-line scroll operation. As a result, the magnitude of the processing load borne by the CPU 5, the image displaying unit and the peripheral circuit is reduced.

Therefore, even if the processing speeds of the CPU 5 and the image displaying unit are not high, they are capable of following up input operations requesting scroll processing carried out by the user at a high speed.

FIG. 12 is a diagram showing an upward scroll operation for 3 unprocessed signals carried out at the step S5. An initial screen image G110 starts at an entry point pt22 corresponding to a first piece of data OO1 of a first message text stored in a message file FILE1. The initial screen image G110 comprises 4 lines including the data OO1 at the entry point pt22.

Since the number of unprocessed signals is 3, the 1-line scroll operation will be carried out 3 times if the conventional technology is adopted. That is to say, the displayed screen image will be moved up over 3 lines, namely, the piece of data OO1 to a piece of LL1, sequentially 1 line after another. During the scroll operation, 4 screen images, that is, the initial screen image G110, 2 intermediate screen images and a final screen image G111, are displayed. With the present invention, on the other hand, the entry point pt22 is just shifted upward by 3 lines in a single display batch operation to the beginning of a piece of data LL1 pointed to by an entry point pt22'.

Thus, the entry point pt22' is newly cataloged in the LUT to update the previous entry point pt22. As a result, the final screen image G111 of 4 lines starting with the piece of data LL1 on the top line and ending with the piece of data OO1 on the bottom line is written into the image file IF as shown in FIG. 12.

That is to say, the final screen image G111 is displayed on the image displaying unit in a single display batch operation and the scroll processing is completed by this single display batch operation.

In the example described above, up to 3 unprocessed signals exist. It should be noted, however, that the number of unprocessed signals is not limited. It is needless to say that this screen scroll technique is capable of keeping up with any number of consecutive inputs and, thus, any number of unprocessed signals.

FIG. 13 is a diagram showing an upward scroll operation for 5 unprocessed signals. An initial screen image G100 starts at an entry point pt21 corresponding to a first piece of data QQ1 of a first message text stored in a message file FILE1. The initial screen image G100 comprises 4 lines including the data QQ1 at the entry point pt21.

Since the number of unprocessed signals is 5, the 1-line scroll operation will be carried out 5 times if the conventional technology is adopted. That is to say, the displayed screen image will be moved up over 5 lines, namely, the piece of data QQ1 to a piece of data LL1, sequentially 1 line after another. During the scroll operation, 6 screen images, that is, the initial screen image G100, 4 intermediate screen images and a final screen image G101, are displayed. With the present invention, on the other hand, the entry point pt21 is just shifted upward by 5 lines in a single display batch operation to the beginning of a piece of data LL1 pointed to by an entry point pt21'.

Thus, the entry point pt21' is newly cataloged in the LUT to update the previous entry point pt21. As a result, the final screen image G101 of 4 lines starting with the piece of data LL1 on the top line and ending with a piece of data OO1 on the bottom line is written into the image file IF as shown in FIG. 13.

That is to say, the final screen image G101 is displayed on the image displaying unit in a single display batch operation and the scroll processing is completed by this single display batch operation.

Figure 14:
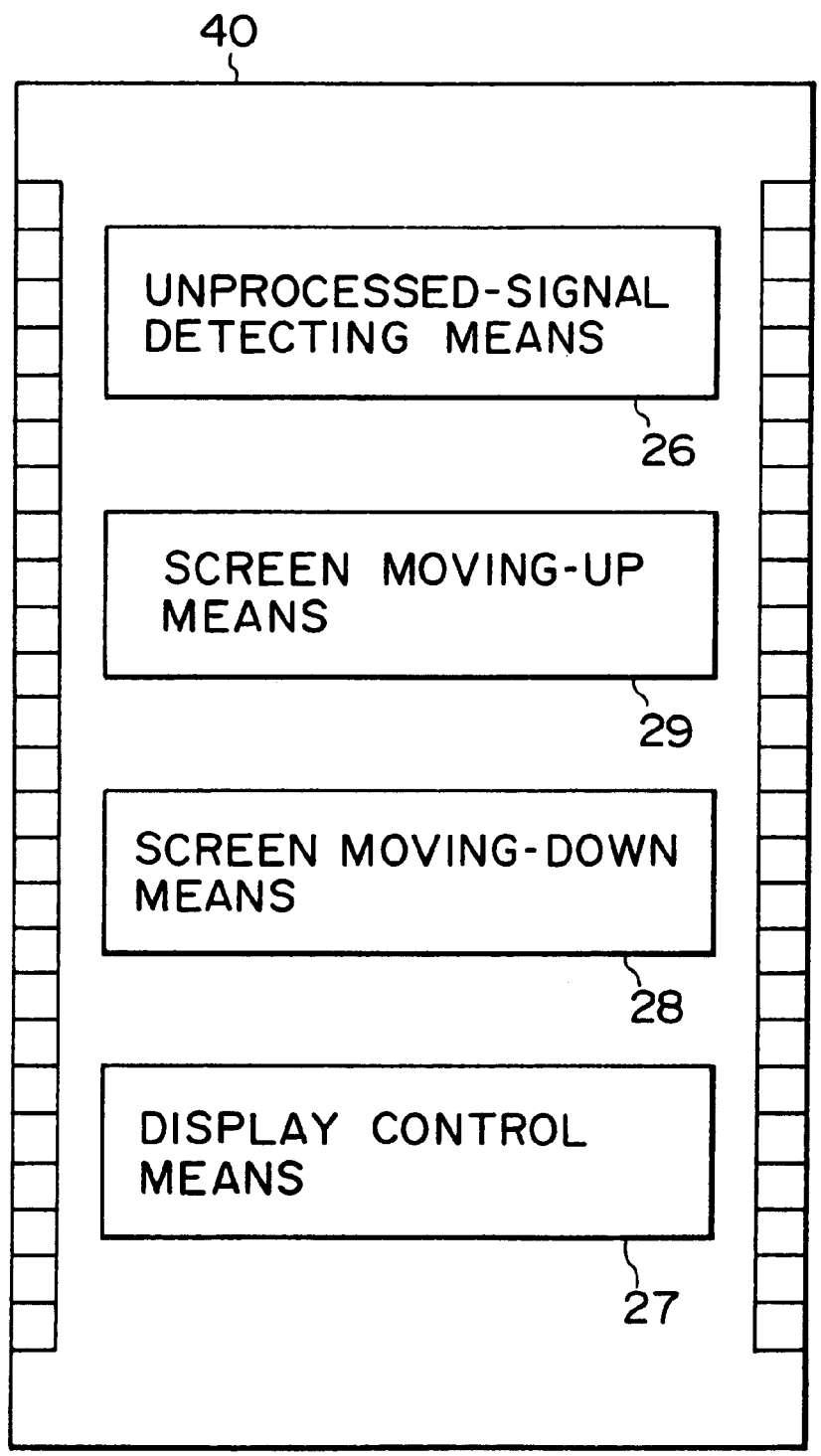
FIG. 14 is an explanatory diagram showing the configuration of a recording medium implemented by a second embodiment of the present invention.

FIG. 14 is an explanatory diagram showing the configuration of a recording medium 40 implemented by a second embodiment of the present invention. The recording medium 40 implemented by the second embodiment of the present invention is explained by referring to this figure as follows.

The recording medium 40 implemented by the second embodiment of the present invention is a single-chip semiconductor memory for storing at least the 4 means described below. Each of the 4 means is a procedure, that is, a program which can be executed by a computer.

The first means is the unprocessed-signal detecting means 26. Fetched and executed by a central processing unit in a computer, the unprocessed-signal detecting means 26 detects unprocessed upward or downward scroll command signals.

The second means is the display control means 27. Fetched for execution by the central processing unit in the computer, the display control means 27 counts the number of unprocessed downward or upward scroll command signals detected by the unprocessed-signal detecting means 26 and drives a screen moving-down means in the case of downward scroll command signals or a screen moving-up means in the case of upward scroll command signals.

The third means is the screen moving-down means 28. Fetched for execution by the central processing unit in the computer, the screen moving-down means 28 moves down a displayed screen by as many lines as detected unprocessed downward scroll command signals.

The fourth means is the screen moving-up means 29. Fetched for execution by the central processing unit in the computer, the screen moving-up means 29 moves up a displayed screen by as many lines as detected unprocessed upward scroll command signals.

As described above, the recording medium 40 is incorporated in a portable radio information terminal including a central processing unit and an input device as a memory for storing operating procedures to be executed by the central processing unit. By letting the central processing unit sequentially execute the 4 means which are each stored in the recording medium 40 as a procedure, it is possible to implement a portable radio information terminal having a function capable of displaying a final screen in single display batch processing at a high-speed during consecutive scroll operations.

The recording medium 40 provided by this embodiment can be applied to mainly a flash memory. In addition, the recording medium can be applied to a read-only MOS memory, an SRAM, an EPROM, an EEPROM and the other so-called non-volatile semiconductor recording mediums.

In addition, the recording medium 40 can also be applied to an optical recording medium, an optical magnetic recording medium and a magnetic recording medium as well.

Figure 15:
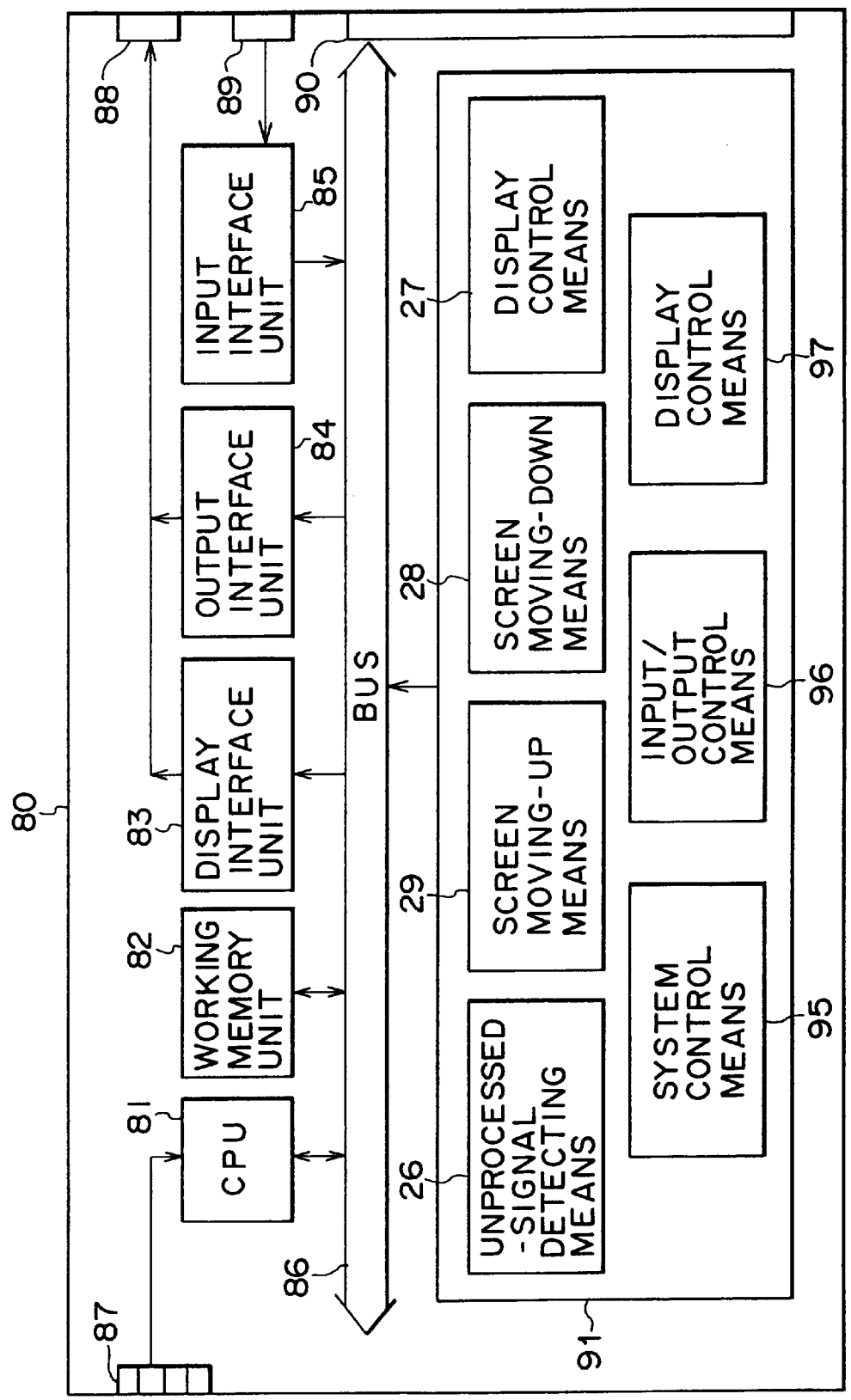
FIG. 15 is a block diagram showing the configuration of a microcomputer implemented by a third embodiment of the present invention.
Figure 16:
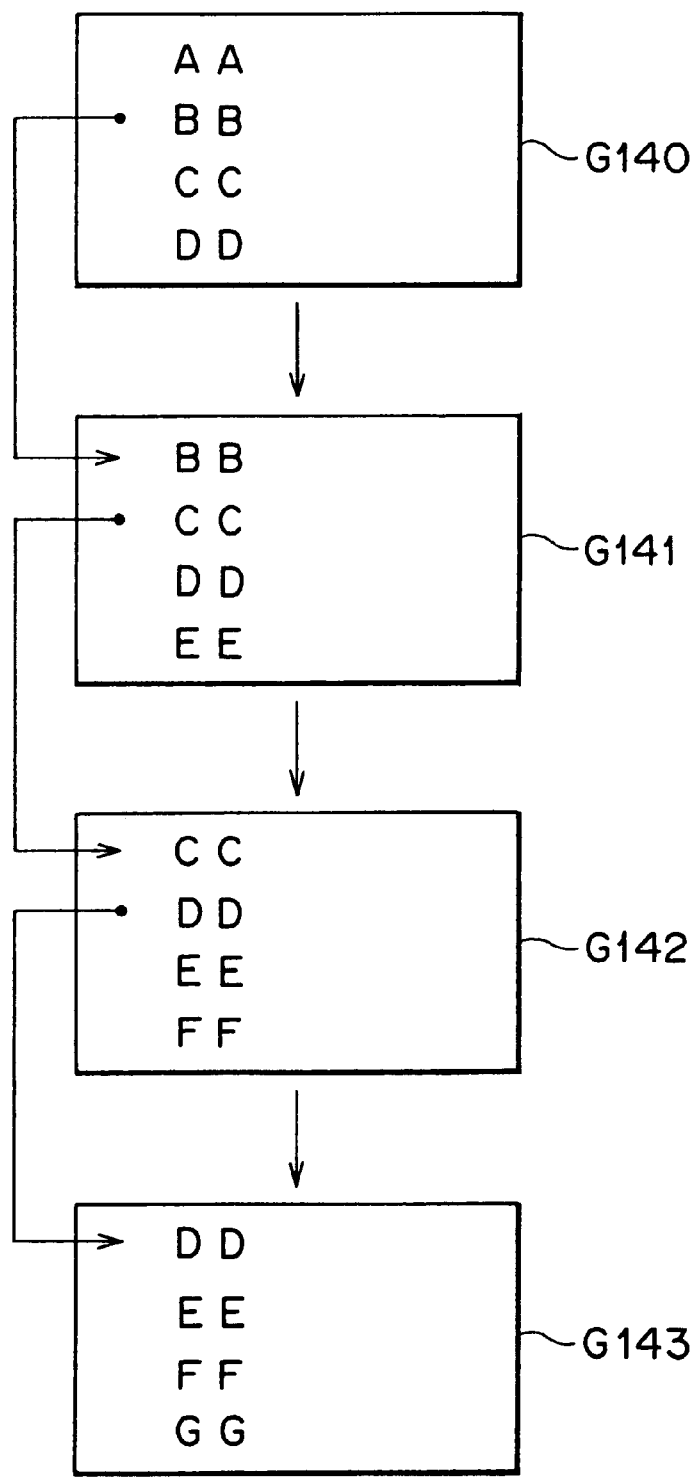
FIG. 16 is an explanatory diagram showing the conventional downward 1-line scroll processing.
Figure 17:
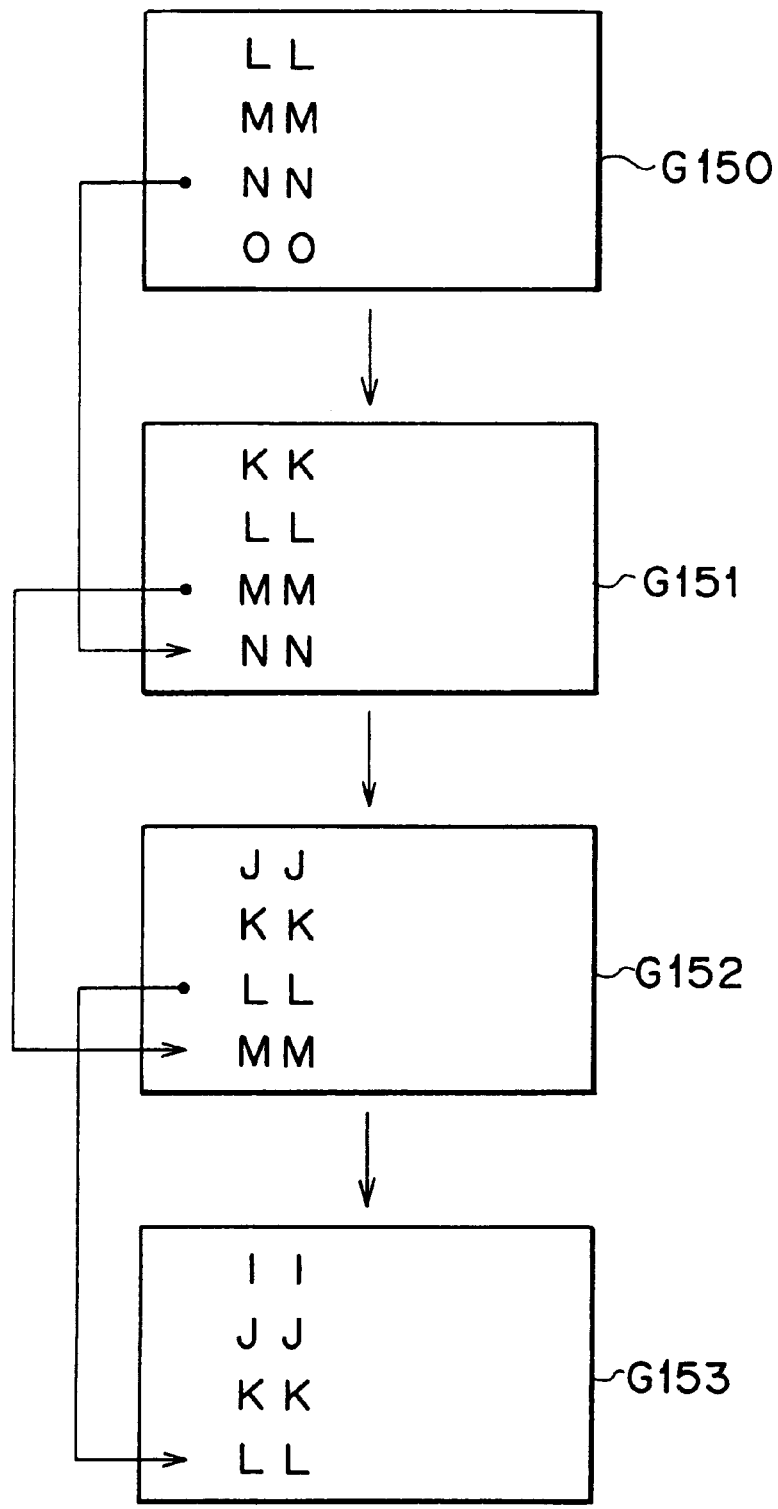
FIG. 17 is an explanatory diagram showing the conventional upward 1-line scroll processing.

FIG. 15 is a block diagram showing the configuration of a microcomputer implemented by a third embodiment of the present invention. The microcomputer implemented by the third embodiment of the present invention is explained by referring to this figure as follows.

Designed into a one-chip product, the microcomputer 80 implemented by the fourth embodiment of the present invention comprises a CPU (central processing unit) 81, a working memory unit 82, a display interface unit 83, an output interface unit 84, an input interface unit 85 and a memory unit 91 which are connected to each other by an internal bus 86 as shown in the figure.

External pins provided on the chip of the microcomputer 80 are interrupt input pins 87 connected to an interrupt input terminal of the CPU 81, an output pins 88 connected to the display interface unit 83 and the output interface unit 84, input pins 89 connected to the input interface unit 85 and common bus pins 90 connected to the internal bus 86.

The memory unit 91 is used for storing programs that can be executed by the CPU 81. The programs include a system control means 95, an input/output control means 96, a display control means 97, the unprocessed-signal detecting means 26, the display control means 27, the screen moving-down means 28 and the screen moving-up means 29.

The system control means 95 is executed to control not only operations of the components inside the chip of the microcomputer 80 but also operations of the whole portable radio information terminal including the microcomputer 80 itself and operations of components in the portable radio information terminal other than the microcomputer 80. The procedure implementing this system control means is adapted to the portable radio information terminal provided by the present invention.

By the same token, the input/output control means 96 is executed to control not only exchanges of data and signals among the components inside the chip of the microcomputer 80 but also exchanges of data and signals between the whole portable radio information terminal including the microcomputer 80 itself as well as components in the portable radio information terminal other than the microcomputer 80 and the outside. The procedure implementing this system control means is adapted to the portable radio information terminal provided by the present invention.

On the other hand, the display control means 97 is executed to control general operations to display a message text on a screen on an image displaying unit externally connected to the microcomputer 80. The general operations to display a message text are operations other than the scroll processing.

Fetched for execution by the CPU 81 employed in the microcomputer 80, the unprocessed-signal detecting means 26 has a function to detect unprocessed upward or downward scroll command signals.

Also fetched for execution by the CPU 81 employed in the microcomputer 80, the display control means 27 has functions to count the number of unprocessed downward or upward scroll command signals detected by the unprocessed-signal detecting means 26 and drive the screen moving-down means 28 in the case of downward scroll command signals or the screen moving-up means 29 in the case of upward scroll command signals.

Also fetched for execution by the CPU 81 employed in the microcomputer 80, the screen moving-down means 28 has a function to move down a displayed screen by as many lines as detected unprocessed downward scroll command signals.

Also fetched for execution by the CPU 81 employed in the microcomputer 80, the screen moving-up means 29 has a function to move up a displayed screen by as many lines as detected unprocessed upward scroll command signals.

By incorporating the microcomputer 80 in a portable radio information terminal equipped with components including a communication mechanism unit, a memory unit for recording a received message, an input device such as a rotary input device used for entering an input command, an image displaying unit for displaying information such as a message and a power-supply circuit, it is possible to easily provide the portable radio information terminal with a high-speed scroll function.

What is claimed is:

1. A screen scroll method of a portable radio information terminal, comprising the steps of:

scrolling up and down an image displayed on a screen of an image displaying unit employed in said portable radio information terminal by a number of lines equal to a number of scroll command signals requesting a scroll operation for scrolling up and down said image, wherein if at least an unprocessed scroll command signal exists, said image displayed on said screen is scrolled up and down said screen by a number of lines equal to a number of unprocessed scroll command signals.

2. A portable radio information terminal, comprising:

radio communication means;

control means for at least performing data processing;

image displaying means including a screen for scrolling up and down an image displayed on said screen by at least one line, wherein said control means at least displays information extracted from a radio electric wave received by said radio communication means from a transmitter on said image displaying means;

input means including a freely operatable operation unit for generating a plurality of upward scroll command signals and a plurality of downward scroll command signals resulting from an operation performed on said input means;

unprocessed-signal detecting means for detecting a plurality of unprocessed upward scroll command signals and a plurality of unprocessed downward scroll command signals among said plurality of upward scroll command signals and said plurality of downward scroll command signals generated by said freely operatable operation unit;

screen moving-up means for shifting up said image displayed on said screen by a number of lines equal to a number of said plurality of unprocessed upward scroll command signals;

screen moving-down means for shifting down said image displayed on said screen by a number of lines equal to a number of said plurality of unprocessed downward scroll command signals; and display control means for at least counting said number of unprocessed upward scroll command signals and said number of unprocessed downward scroll command signals and driving said screen moving-up means for said plurality of upward scroll command signals and driving said screen moving-down means for said plurality of downward scroll command signals.

3. The portable radio information terminal as set forth in claim 2, wherein said input means is a rotary input device including said freely operatable operation unit for generating said plurality of upward scroll command signals and said plurality of downward scroll command signals resulting from a rotation of said rotary input device in a unit time.

4. A recording medium, comprising:

means for storing a plurality of programs fetched for execution by a computer, wherein said plurality of programs include at least unprocessed-signal detecting means for detecting a plurality of unprocessed upward scroll command signals and a plurality of unprocessed downward scroll command signals among a plurality of upward scroll command signals and a plurality of downward scroll command signals requesting a scroll-down operation and a scroll-up operation, respectively, of an image displayed on a screen, screen moving-up means for shifting up said image displayed on said screen by a number of lines equal to a number of said plurality of unprocessed upward scroll command signals screen moving-down means for shifting down said image displayed on said screen by a number of lines equal to a number of said plurality of unprocessed downward scroll command signals and display control means for at least counting said number of said plurality of unprocessed upward scroll command signals and said number of said plurality of unprocessed downward scroll command signals and driving said screen moving-up means for said plurality of upward scroll command signals and driving said screen moving-down means for said plurality of downward scroll command signals.

5. A microcomputers comprising:

an embedded central processing unit;

embedded storage means for storing a plurality of programs fetched and executed by said embedded central processing unit; embedded data transfer means used for connecting at least said embedded central processing unit to said embedded storage means, wherein said embedded data transfer means can be connected to external equipment; and means for providing a function for transmitting a signal based on a processing result output by said embedded central processing unit to said external equipment by one of radio communication and a wire connection, wherein said plurality of programs stored in said embedded storage means at least include unprocessed-signal detecting means for detecting a plurality of unprocessed upward scroll command signals and a plurality of unprocessed downward scroll command signals among a plurality of upward scroll command signals and a plurality of downward scroll command signals requesting a scroll-down operation and a scroll-up operation, respectively, of an image displayed on a screen screen moving-up means for shifting up said image displayed on said screen by a number of times equal to a number of said plurality of unprocessed upward scroll command signals, screen moving-down means for shifting down said image displayed on said screen by a number of times equal to a number of said plurality of unprocessed downward scroll command signals and display control means for at least counting said number of said plurality of unprocessed upward scroll command signals and said number of said plurality of unprocessed downward scroll command signals and driving said screen moving-up means for said plurality of upward scroll command signals and driving said screen moving-down means for said plurality of downward scroll command signals.

* * * * *